United States Patent
Saito

(10) Patent No.: US 11,462,213 B2
(45) Date of Patent: Oct. 4, 2022

(54) INFORMATION PROCESSING APPARATUS, INFORMATION PROCESSING METHOD, AND PROGRAM

(71) Applicant: SONY CORPORATION, Tokyo (JP)

(72) Inventor: Mari Saito, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 815 days.

(21) Appl. No.: 16/074,202

(22) PCT Filed: Jan. 12, 2017

(86) PCT No.: PCT/JP2017/000726
§ 371 (c)(1),
(2) Date: Jul. 31, 2018

(87) PCT Pub. No.: WO2017/168936
PCT Pub. Date: Oct. 5, 2017

(65) Prior Publication Data
US 2021/0142796 A1    May 13, 2021

(30) Foreign Application Priority Data
Mar. 31, 2016 (JP) .............................. JP2016-070593

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/165* (2013.01); *G10L 15/07* (2013.01); *G10L 15/32* (2013.01);
(Continued)

(58) Field of Classification Search
CPC ......... G10L 15/22; G10L 15/32; G10L 15/07; G10L 2015/223; G10L 2015/225; G06F 3/165
See application file for complete search history.

(56) References Cited

U.S. PATENT DOCUMENTS 5,495,282 A * 2/1996 Mostafa ................. H04N 5/765
725/20
10,075,140 B1 * 9/2018 Dietrich ............... H03G 3/3089
(Continued)

FOREIGN PATENT DOCUMENTS

JP    2003-150194 A    5/2003
JP    2005-266020 A    9/2005
(Continued)

*Primary Examiner* — Michael N Opsasnick
(74) *Attorney, Agent, or Firm* — Paratus Law Group, PLLC

(57) ABSTRACT

There is provided an information processing apparatus to realize more natural dialog between users and a system, the information processing apparatus including: a control unit that selects a feedback mode in response to a speech style of a user from among a plurality of modes in accordance with information related to recognition of speech of the user. The plurality of modes include a first mode in which implicit feedback is performed and a second mode in which explicit feedback is performed. Provided is an information processing method including: selecting, by a processor, a feedback mode in response to a speech style of a user from among a plurality of modes in accordance with information related to recognition of speech of the user. The plurality of modes include a first mode in which implicit feedback is performed and a second mode in which explicit feedback is performed.

20 Claims, 17 Drawing Sheets

(51) Int. Cl.
*G10L 15/07* (2013.01)
*G10L 15/32* (2013.01)

(52) U.S. Cl.
CPC .. *G10L 2015/223* (2013.01); *G10L 2015/225* (2013.01)

(56) References Cited

U.S. PATENT DOCUMENTS

| | | | | |
|---|---|---|---|---|
| 2005/0207594 | A1* | 9/2005 | Uehara | H03G 3/3026 |
| | | | | 381/104 |
| 2006/0287850 | A1* | 12/2006 | Morikawa | G10L 15/22 |
| | | | | 704/200 |
| 2008/0177734 | A1* | 7/2008 | Schwenke | G06F 16/9038 |
| 2011/0207094 | A1* | 8/2011 | Bellanova | G09B 21/009 |
| | | | | 434/116 |
| 2011/0307241 | A1* | 12/2011 | Waibel | G10L 15/06 |
| | | | | 704/2 |
| 2014/0149121 | A1* | 5/2014 | Di Fabbrizio | G10L 21/00 |
| | | | | 704/270.1 |
| 2014/0343947 | A1* | 11/2014 | Winter | G10L 15/22 |
| | | | | 704/270.1 |
| 2015/0025885 | A1* | 1/2015 | Patch | G10L 15/26 |
| | | | | 704/235 |
| 2015/0379981 | A1* | 12/2015 | Balasubramanian | G06Q 30/0261 |
| | | | | 704/260 |
| 2015/0379985 | A1* | 12/2015 | Wang | G10L 15/07 |
| | | | | 704/250 |
| 2016/0035353 | A1* | 2/2016 | Chen | G10L 13/08 |
| | | | | 704/235 |
| 2017/0337921 | A1* | 11/2017 | Aoyama | G10L 15/26 |

FOREIGN PATENT DOCUMENTS

| | | |
|---|---|---|
| JP | 2006-251061 A | 9/2006 |
| JP | 2007-264126 A | 10/2007 |
| JP | 2011-209787 A | 10/2011 |
| JP | 2014-186184 A | 10/2014 |
| WO | WO 2005/076258 A1 | 8/2005 |

* cited by examiner

FIG. 6

| LEVEL | CLASSIFICATION | RANGE | SYSTEM DEFINITION |
|---|---|---|---|
| 1 | SMALL | Xdb~Ydb | INITIAL OUTPUT SETTING |
| 2 | MIDDLE | Ydb~Zdb | SOUND VOLUME LARGER THAN INITIAL OUTPUT SETTING BY ONE STAGE |
| 3 | LARGE | Zdb~Wdb | MAXIMUM SOUND VOLUME FOR IMPLICIT FEEDBACK |

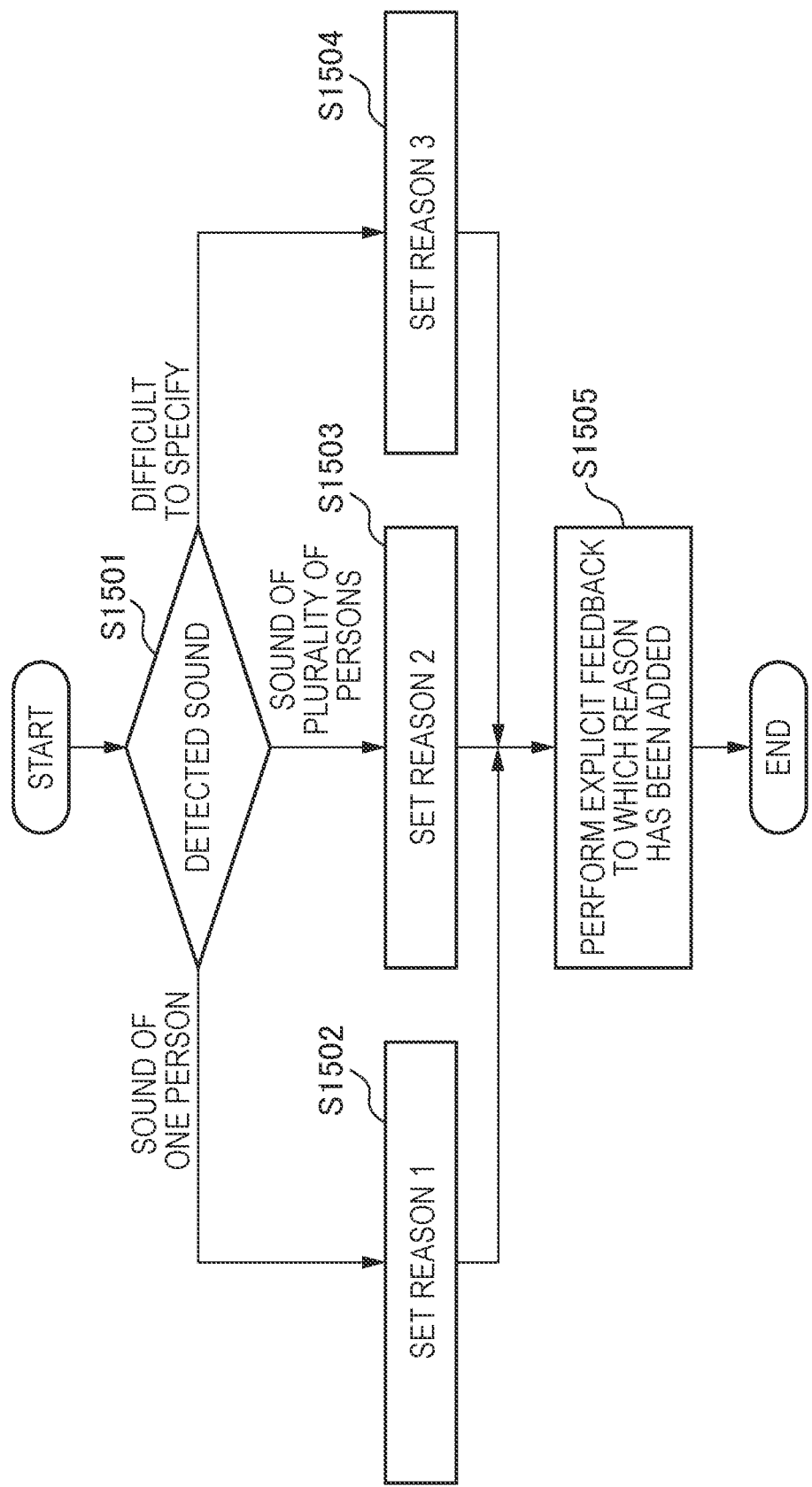

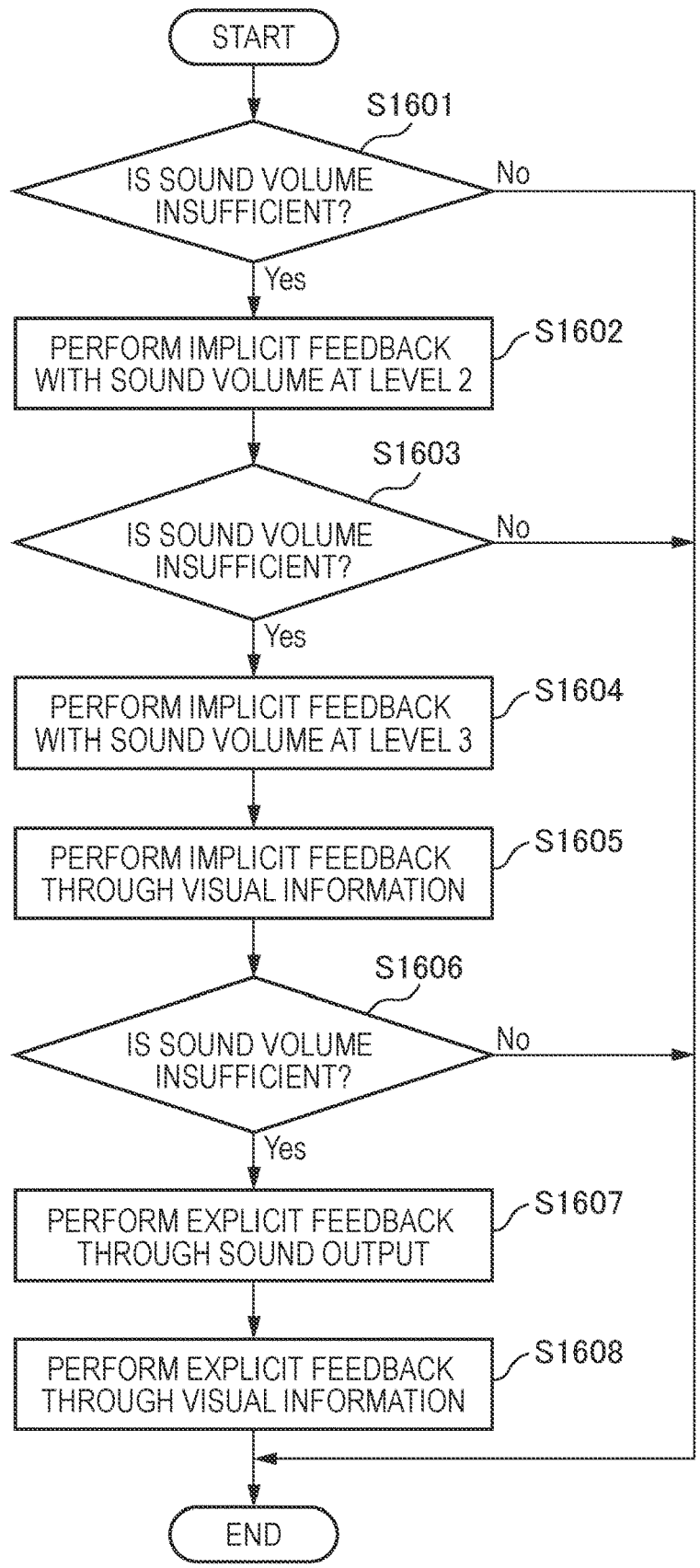

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2017/000726 (filed on Jan. 12, 2017) under 35 U.S.C. § 371, which claims priority to Japanese Patent Application No. 2016-070593 (filed on Mar. 31, 2016), which are all hereby incorporated by reference in their entirety.

TECHNICAL FIELD

The present disclosure relates to an information processing apparatus, an information processing method, and a program.

BACKGROUND ART

In recent years, various apparatuses that recognize speech or actions of users and execute processing corresponding to recognized inputs have been proposed. Also, technologies of performing feedback on inputs from users to enhance recognition accuracy of the inputs are known. As the aforementioned technologies, there is an information processing apparatus described in Patent Literature 1.

CITATION LIST

Patent Literature

Patent Literature 1: JP 2011-209787 A

SUMMARY OF INVENTION

Technical Problem

However, a scheme of the feedback in response to the inputs is fixed, and it is difficult to address individual users' situations, according to the information processing apparatus described in Patent Literature 1.

Thus, the present disclosure will propose an information processing apparatus, an information processing method, and a program capable of realizing more natural dialog between users and a system.

Solution to Problem

According to the present disclosure, there is provided an information processing apparatus including: a control unit that selects a feedback mode in response to a speech style of a user from among a plurality of modes in accordance with information related to recognition of speech of the user. The plurality of modes include a first mode in which implicit feedback is performed and a second mode in which explicit feedback is performed.

Advantageous Effects of Invention

According to the present disclosure, it is possible to realize more natural dialog between users and the system as described above. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is a diagram for describing sound volume levels of the input and output terminal according to the embodiment.

FIG. 10 is a diagram for describing a flow for control of explicit feedback to which a reason for improvement is added, according to the embodiment.

FIG. 11 is a diagram illustrating a flow for additional control of feedback based on visual information according to the embodiment.

DESCRIPTION OF EMBODIMENTS

Figure 1:
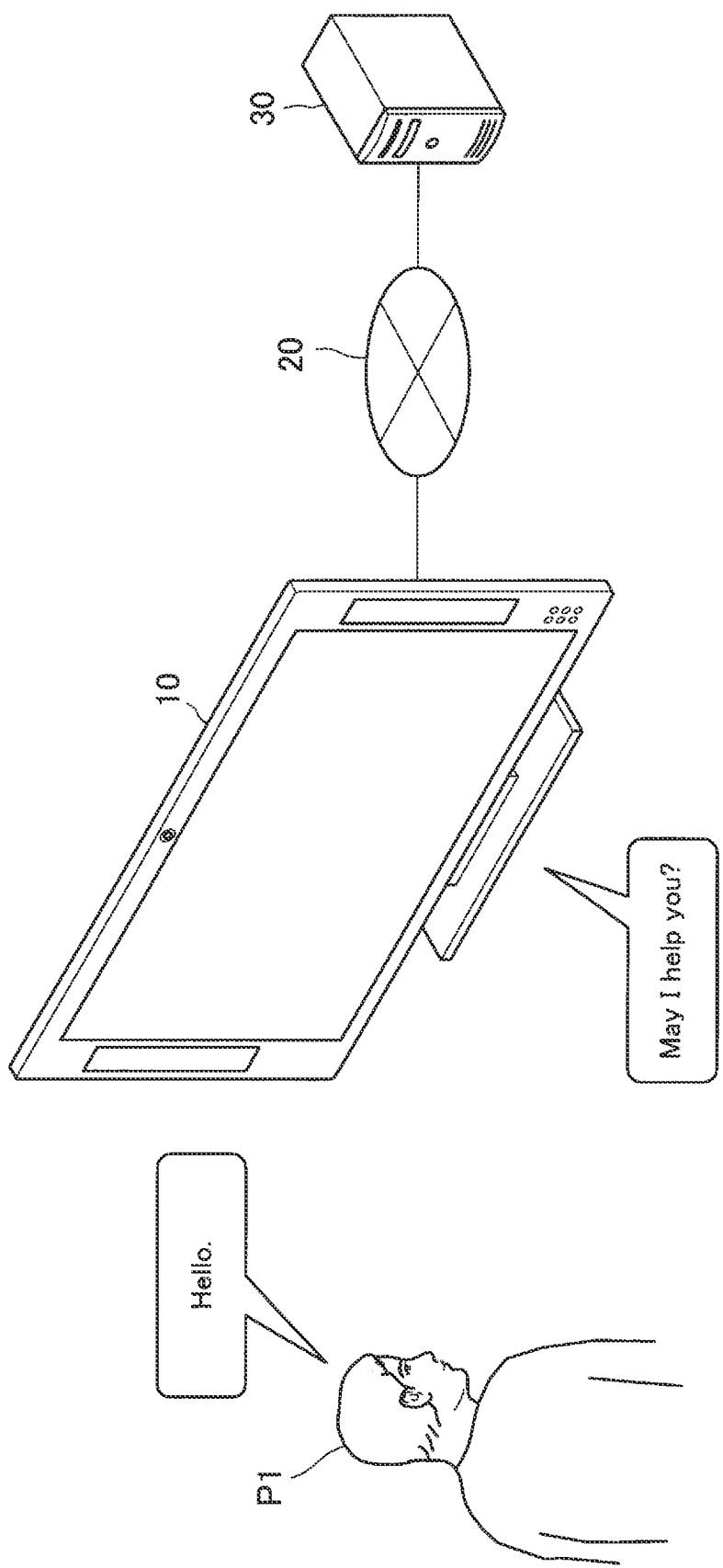
FIG. 1 is a diagram illustrating a system configuration example according to the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be given in the following order.
1. Control of feedback according to the present disclosure
1.1. Feedback according to sound recognition technology
1.2. System configuration example according to the present disclosure
1.3. Input and output terminal 10 according to the present disclosure
1.4. Information processing apparatus 30 according to the present disclosure
2. Embodiment
2.1. Concerning feedback modes
2.2. Examples of implicit feedback
2.3. Switching of modes related to feedback
2.4. Explicit feedback to which reason for improvement is added
2.5. Additional control of feedback through visual information
2.6. Examples of feedback through visual information
3. Hardware configuration examples of input and output terminal 10 and information processing apparatus 30
4. Conclusion

1. Control of Feedback According to the Present Disclosure

<<1.1. Feedback According to Sound Recognition Technology>>

In recent years, various apparatuses using sound recognition technologies have been provided. The apparatuses using the sound recognition technologies such as home appliances, in-vehicle apparatuses, and the like as well as information processing apparatuses such as personal computers (PCs) and smartphones have been widely used in situations that general consumers encounter frequently. In addition, the apparatuses using the sound recognition technologies are also expected be used in the future as subjects that provide services to customers in place of persons in commercial facilities and community facilities.

According to the aforementioned apparatuses, it is possible to recognize speech of users and to execute processing of applications on the basis of content of the recognized speech, for example. In addition, the aforementioned apparatuses have a function of performing feedback for the users in accordance with results of recognizing speech of the users in some cases. The feedback is performed by displaying a text message "I can't hear you," on a display unit of an apparatus in a case in which the apparatus cannot recognize the speech of a user for example. The users can perceive that the content of the speech has not been recognized by the apparatuses by checking the message, and take the next action. In this manner, the apparatuses utilizing the sound recognition technologies can ask users to improve their speech by performing feedback related to speech. At this time, the probability of users' speech improving increases when the content of the feedback from the apparatus is clearer.

Meanwhile, the feedback from the apparatus significantly affects a user's impression of the apparatuses. In a case in which the feedback from the apparatuses is always straightforward, for example, users may have an impression that the apparatus is "cold" or "stiff," for example. This is because the users compare dialog with actual persons and dialog with the apparatus. Since dialog between persons changes in accordance with situations, the users feel that the apparatus that always performs invariable feedback is unnatural. In addition, the impression described above may lead to evaluation that the technical level of the apparatus is poor. Further, in a case in which the feedback from the apparatus is clear, it is assumed that some users will feel that the apparatus is giving orders and develop an aversion to the apparatus.

An information processing apparatus, an information processing method, and a program according to the present disclosure have been contrived by paying attention to the above points, and one of features thereof is to select a feedback mode in response to a speech style of a user from among a plurality of modes in accordance with information related to recognition of speech of the user. In addition, a first mode in which implicit feedback is performed and a second mode in which explicit feedback is performed are included in the aforementioned plurality of modes. In the following description, advantages achieved by the features of the information processing apparatus, the information processing method, and the program according to the present disclosure will be described while listing the features.

<<1.2. System Configuration Example According to the Present Disclosure>>

First, a configuration example of an information processing system according to the present disclosure will be described with reference to FIG. 1. Referring to FIG. 1, the information processing system according to the present disclosure includes an input and output terminal 10 and an information processing apparatus 30. In addition, the input and output terminal 10 and the information processing apparatus 30 are connected such that the input and output terminal 10 and the information processing apparatus 30 can communicate with each other via a network 20.

Here, the input and output terminal 10 may be a terminal that collects speech of a user and presents a result of processing an application based on the speech to the user. In addition, the input and output terminal 10 may have a function of performing feedback in response to the speech of the user. FIG. 1 illustrates an example in which the input and output terminal 10 performs feedback through a sound output "May I help you?" in response to speech "Hello." of a user P1.

In addition, the information processing apparatus 30 according to the present disclosure has a function of controlling feedback executed by the input and output terminal 10 on speech of the user P1 on the basis of the speech of the user P1 collected by the input and output terminal 10. The information processing apparatus 30 may acquire the speech of the user P1 collected by the input and output terminal 10 via the network 20 and select a feedback mode in response to the speech style from among a plurality of modes in accordance with information based on the speech. In addition, a first mode in which implicit feedback is performed and a second mode in which explicit feedback is performed may be included in the aforementioned plurality of modes.

In addition, the network 20 may include various local area networks (LANs), wide area networks (WANs), and the like including Ethernet (registered trademark). The network 20 may be a dedicated line network such as Internet Protocol-Virtual Private Network (IP-VPN).

Note that although the system configuration including the input and output terminal 10 and the information processing apparatus 30 will be described as an example in the following description, the configuration of the information system according to the present disclosure is not limited to such an example. For example, the information processing apparatus 30 may have a function of collecting speech of the user and executing feedback on the speech. In a case in which the information processing apparatus 30 has input and output functions as described above, the information processing apparatus 30 can be in charge of controlling the feedback and also serve as the input and output terminal 10.

In addition, the function of the application processed on the basis of the result of recognizing sound may be executed by the input and output terminal 10 or may be executed by the information processing apparatus 30. The processing of the application based on the speech of the user can be appropriately changed depending on specifications of the application, the input and output terminal 10, and the information processing apparatus 30.

<<1.3. Input and Output Terminal 10 According to the Present Disclosure>>

Next, the input and output terminal 10 according to the present disclosure will be described in detail. As described above, the input and output terminal 10 according to the present disclosure has a function of collecting speech of the user. In addition, the input and output terminal 10 has a function of presenting, to the user, information about feedback controlled by the information processing apparatus 30 in accordance with the information related to the recognition of the speech of the user.

The input and output terminal 10 according to the present disclosure can be realized as various devices that have the aforementioned functions. The input and output terminal 10 according to the present disclosure may be a dedicated agent that executes various kinds of processing on the basis of the speech of the user, for example. An interactive robot, a vending machine, a sound guidance device, or the like may be included in the agent. In addition, the input and output terminal 10 according to the present disclosure may be an information processing terminal such as a personal computer (PC), a tablet, or a smartphone. Further, the input and output terminal 10 may be a device that is incorporated into a building or a vehicle when used. The input and output terminal 10 according to the present disclosure can be applied to various devices that adapt the function of recognizing sound.

Figure 2:
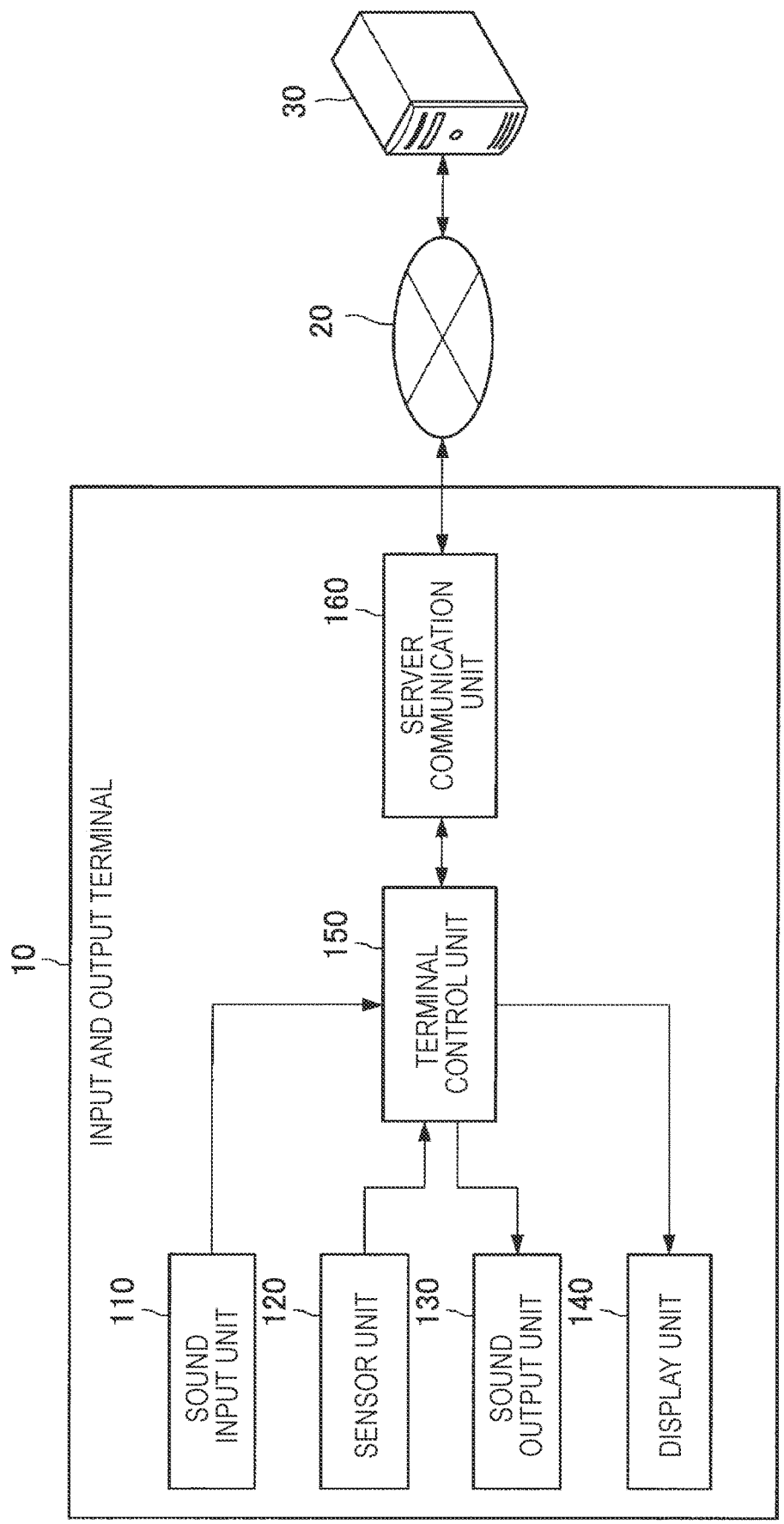
FIG. 2 is a functional block diagram of an input and output terminal according to the present disclosure.

Hereinafter, a functional configuration example of the input and output terminal 10 according to the present disclosure will be described with reference to FIG. 2. Referring to FIG. 2, the input and output terminal 10 according to the present disclosure includes a sound input unit 110, a sensor unit 120, a sound output unit 130, a display unit 140, a terminal control unit 150, and a server communication unit 160.

(Sound Input Unit 110)

The sound input unit 110 has a function of collecting speech of the user and environmental sounds. The sound input unit 110 may include a microphone that converts the speech of the user and the environmental sounds into electric signals. In addition, the sound input unit 110 may include a microphone array that has directionality of collecting sound in a specific direction. The sound input unit 110 can also collect the speech of the user and the environmental sounds separately by the microphone array as described above. In addition, the sound input unit 110 may include a plurality of microphones and microphone arrays. With this configuration, it is possible to more accurately detect positions, directions, motion, and the like of sound sources.

(Sensor Unit 120)

The sensor unit 120 has a function of detecting various kinds of information related to objects including the user. The sensor unit 120 may include a plurality of sensors for detecting the aforementioned information. The sensor unit 120 may include an imaging element, an infrared sensor, a temperature sensor, and the like for detecting actions of the user. In addition, the sensor unit 120 may have a function of performing image recognition based on captured images. For example, the sensor unit 120 can specify the user who is speaking by detecting motion of the mouth of the user.

(Sound Output Unit 130)

The sound output unit 130 has a function of converting electric signals into sound and outputting the sound. Specifically, the sound output unit 130 has a function of performing feedback for the user by a sound output on the basis of information about the feedback controlled by the information processing apparatus 30. The sound output unit 130 may include a speaker that has the aforementioned function. In addition, the speaker included in the sound output unit 130 may have a function of realizing a sound output with directionality in terms of a specific direction, a distance, or the like. The sound output unit 130 can perform the sound output in accordance with the position of the user detected by the sensor unit 120, for example, by including the speaker that has that function. In addition, the sound output unit 130 may include a plurality of speakers. In a case in which the sound output unit 130 includes a plurality of speakers, it is possible to execute the feedback in accordance with the position of the user by controlling a speaker that outputs the feedback. Details of this function will be described later.

Further, the sound output unit 130 may have a function of synthesizing sound on the basis of the information about the feedback controlled by the information processing apparatus 30. The sound output unit 130 may perform text reading (TTS: text to speech) on the basis of text information acquired from the information processing apparatus 30, for example.

(Display Unit 140)

The display unit 140 has a function of performing feedback for the user through visual information on the basis of the information about the feedback controlled by the information processing apparatus 30. The function may be realized by a cathode ray tube (CRT) display device, a liquid crystal display (LCD) device, or an organic light emitting diode (OLED) device, for example. In addition, the display unit 140 may function as an operation unit that receives the user's operations. The function of the operation unit can be realized by a touch panel, for example.

(Terminal Control Unit 150)

The terminal control unit 150 has a function of controlling the respective configurations of the input and output terminal 10 described above. The terminal control unit 150 may have a function of acquiring various kinds of information detected by the sound input unit 110 and the sensor unit 120 and transmitting the information to the information processing apparatus 30 via the server communication unit 160, which will be described later, for example. In addition, the terminal control unit 150 may acquire the information related to the feedback from the information processing apparatus 30 via the server communication unit 160 and control the sound output unit 130 and the display unit 140 on the basis of the information. In addition, in a case in which an application that executes processing on the basis of the speech of the user is provided in the input and output terminal 10, the terminal control unit 150 can control the processing of the application.

The input and output terminal 10 according to the present disclosure has been described above. In the above description, the exemplary case in which the input and output terminal 10 has both the function of receiving inputs such as speech of the user and the function of presenting feedback in accordance with the information related to the recognition of the speech of the user to the user has been described. Meanwhile, the system configuration according to the embodiment is not limited to such an example. The system according to the present disclosure may include an input terminal that has an input function and an output terminal that presents the aforementioned feedback separately. In this case, the input terminal may include the functions of the sound input unit 110, the sensor unit 120, and the terminal control unit 150 as described above, for example. In addition, the output terminal may include the functions of the sound output unit 130, the display unit 140, and the terminal control unit 150 as described above, for example. The system configuration according to the present disclosure can be flexibly deformed.

(Server Communication Unit 160)

The server communication unit 160 has a function of performing information communication with the information processing apparatus 30 via the network 20. Specifically, the server communication unit 160 transmits the information acquired by the sound input unit 110 and the sensor unit 120 to the information processing apparatus 30 on the basis of control performed by the terminal control unit 150. In addition, the server communication unit 160 transfers the information about the feedback acquired from the information processing apparatus 30 to the terminal control unit 150.

<<1.4. Information Processing Apparatus 30 According to the Present Disclosure>>

Next, the information processing apparatus 30 according to the present disclosure will be described in detail. The information processing apparatus 30 according to the present disclosure has a function of controlling the feedback executed by the input and output terminal 10 in response to the speech style of the user in accordance with the information related to the recognition of the speech of the user, which has been collected by the input and output terminal 10. The information processing apparatus 30 can select a feedback mode in response to the speech style of the user from among a plurality of modes in accordance with the information related to the recognition of the speech of the user. The first mode in which implicit feedback is performed and the second mode in which explicit feedback is performed may be included in the aforementioned plurality of modes. In addition, a sound volume, a speech speed, a speech pitch, clarity of pronunciation, a speech position, a speech direction, speech content, and environmental sounds may be included in the aforementioned speech style.

The information processing apparatus 30 according to the present disclosure may be a server that has the aforementioned functions. In addition, the information processing apparatus 30 may be any of various kinds of agents, PCs, tablets, or smartphones that detect speech of the user and execute feedback.

Figure 3:
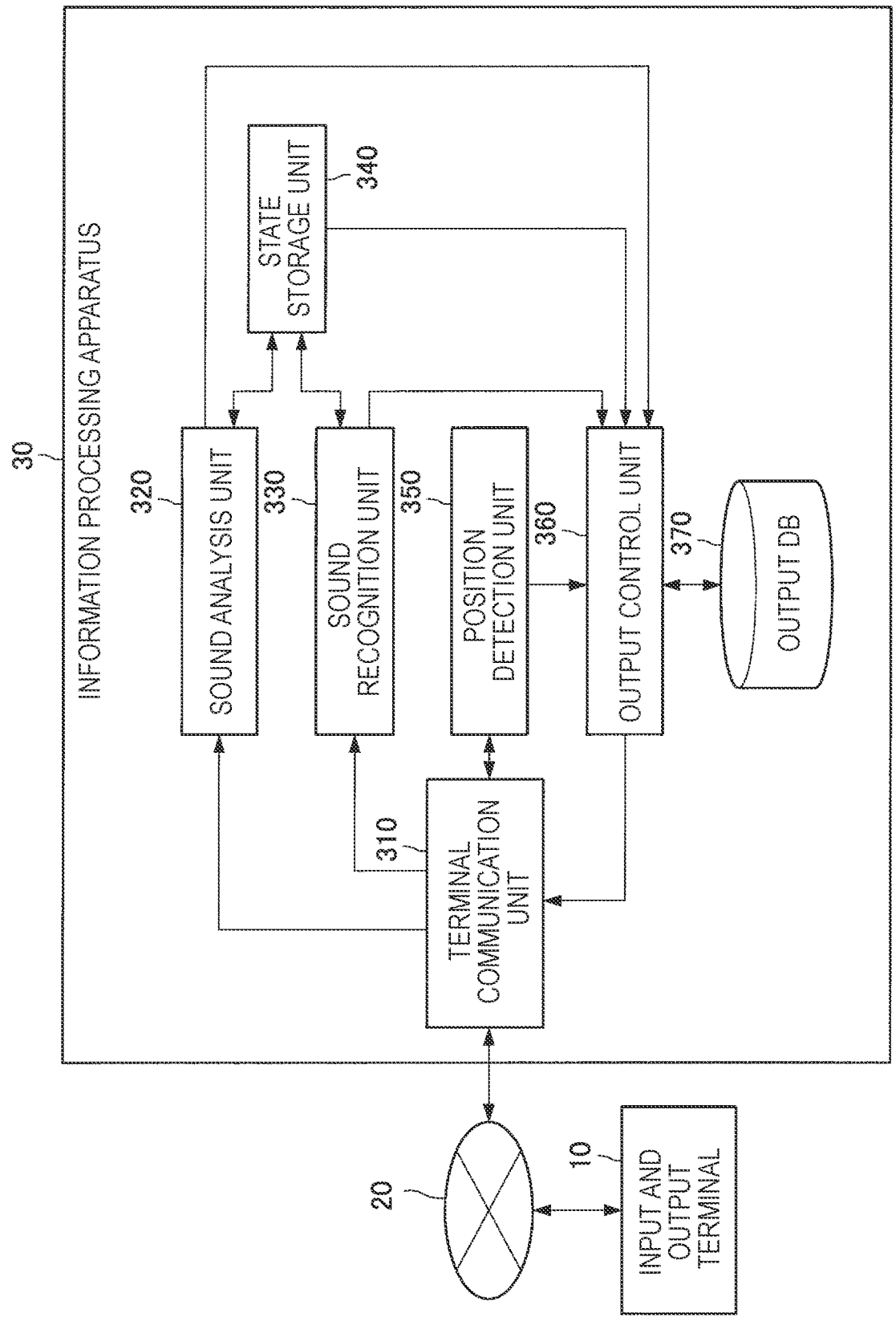
FIG. 3 is a functional block diagram of an information processing apparatus according to the present disclosure.

Hereinafter, a functional configuration example of the information processing apparatus 30 according to the present disclosure will be described with reference to FIG. 3. Referring to FIG. 3, the information processing apparatus 30 according to the present disclosure includes a terminal communication unit 310, a sound analysis unit 320, a sound recognition unit 330, a state storage unit 340, a position detection unit 350, and an output control unit 360.

(Terminal Communication Unit 310)

The terminal communication unit 310 has a function of performing information communication with the input and output terminal 10 via the network 20. Specifically, the terminal communication unit 310 passes various kinds of information acquired from the input and output terminal 10 to the sound analysis unit 320, the sound recognition unit 330, and the position detection unit 350. In addition, the terminal communication unit 310 has a function of acquiring information about the feedback controlled by the output control unit 360 and transmitting the information to the input and output terminal 10. Note that in a case in which the information processing apparatus 30 controls a plurality of input and output terminals 10, the terminal communication unit 310 may perform information communication with the plurality of input and output terminals 10 via the network 20.

(Sound Analysis Unit 320)

The sound analysis unit 320 has a function of acquiring information collected by the input and output terminal 10 and analyzing the information. The sound analysis unit 320 can analyze information related to the speech style of the user, including a sound volume, a speech speed, a speech pitch, clarity of pronunciation, and the like of the user, for example. In addition, environmental sounds collected in addition to the speech of the user may be included in the aforementioned speech style of the user. In addition, the sound analysis unit 320 may have a function of separating the speech of the user and the environmental sounds from the information collected by the input and output terminal 10. The separation of the speech of the user and the environmental sounds may be performed on the basis of information about a frequency band related to the human voice or the like or may be realized by a voice activity detection (VAD) technology or the like. In addition, in a case in which the state storage unit 340, which will be described later, stores individual information related to sound of a predetermined user, the sound analysis unit 320 can also separate the speech of the user and the environmental sounds using the information.

In addition, the sound analysis unit 320 may have a function of analyzing the speech of the user collected by the input and output terminal 10 and specifying the user. The specification of the user may be performed by comparing the result of analyzing the speech of the user with voiceprint information of the user stored in the state storage unit 340, which will be described later.

In addition, the sound analysis unit 320 may have a function of analyzing the speech of the user collected by the input and output terminal 10 and estimating an emotion of the user. The estimation of the emotion of the user may be performed by analyzing a rhythm, an amplitude, stress, and the like, for example.

(Sound Recognition Unit 330)

The sound recognition unit 330 has a function of recognizing the speech of the user on the basis of the sound collected by the input and output terminal 10 and the sound of the user separated by the sound analysis unit 320. Specifically, the sound recognition unit 330 may have a function of converting the acquired sound information into phonemes and then converting it into text. Note that since various methods may be used to recognize the sound by the sound recognition unit 330, detailed description will be omitted.

(State Storage Unit 340)

The state storage unit 340 has a function of storing results of performing processing by the sound analysis unit 320 and the sound recognition unit 330. The state storage unit 340 can store the information related to the speech style of the user analyzed by the sound analysis unit 320 and results of recognizing sound by the sound recognition unit 330, for example. In addition, the state storage unit 340 may store attribute information of the user including features related to the sound of the user, trends of the speech style, and the like.

(Position Detection Unit 350)

The position detection unit 350 has a function of estimating the speech position and the speech direction of the user on the basis of the information acquired by the input and output terminal 10. The position detection unit 350 can estimate the speech position and the speech direction of the user on the basis of the sound information collected by the sound input unit 110 of the input and output terminal 10 and the information collected by various sensors, which includes image information acquired by the sensor unit 120. In addition, the position detection unit 350 may estimate positions of persons and objects other than the user who is performing the speech, on the basis of the aforementioned information.

(Output Control Unit 360)

The output control unit 360 has a function of acquiring various kinds of information from the sound analysis unit 320, the sound recognition unit 330, the state storage unit 340, and the position detection unit 350 and controlling feedback in response to the speech of the user. The output control unit 360 selects a feedback mode in response to the speech style of the user from among the plurality of modes on the basis of the aforementioned information. The first mode in which implicit feedback is performed and the second mode in which explicit feedback is performed are included in the plurality of modes. In addition, the output control unit 360 may generate information about the feedback through sound or visual information, which is to be performed by the input and output terminal 10, and transmit the information to the input and output terminal 10 via the terminal communication unit 310. The output control unit 360 may generate the aforementioned information about the feedback by retrieving feedback information based on conditions from an output DB 370, which will be described later. Details of the control of feedback performed by the output control unit 360 will be described later.

(Output DB 370)

The output DB 370 may be database that accumulates the information about the feedback through sound or visual information, which is performed by the input and output terminal 10. The output DB 370 may store sound information related to the feedback or may store text information for outputting sound by a function of synthesizing sound of the input and output terminal 10. In addition, the output DB 370 may store image information or text information related to the feedback performed through the visual information by the input and output terminal 10.

2. Embodiment

<<2.1. Concerning Feedback Modes>>

The outline of the control of feedback according to the present disclosure has been described above. Next, the control of feedback according to an embodiment of the present disclosure will be described in detail. The information processing apparatus 30 according to the embodiment can select a feedback mode in response to the speech style of the user from among a plurality of modes in accordance with the information related to the recognition of the speech of the user.

(Implicit Feedback)

The implicit feedback is feedback including a method of indirectly improving the speech style of the user. That is, in the implicit feedback, feedback is performed by changing an output style of the input and output terminal 10 without directly presenting the method of improving the speech style to the user. Here, the implicit feedback according to the embodiment may be defined as feedback in the speech style with higher recognition accuracy than the speech style of the user. The aforementioned recognition accuracy may be recognition accuracy of the input and output terminal 10 for the speech of the user. In other words, the feedback using speech style that the user is expected to employ is performed in the first mode in which the implicit feedback is performed.

In a case in which the sound volume of the speech of the user is small, for example, feedback through a sound output with a larger sound volume than the sound volume of the speech of the user may be performed in the first mode. In addition, in a case in which the speech speed of the user is too high, for example, feedback through a sound output at a lower speed than the speech speed of the user may be performed in the first mode. In addition, it is also possible to perform feedback in the direction opposite to the above direction in the first mode according to the embodiment. That is, in a case in which the sound volume of the speech of the user is large, feedback through a sound output with a smaller sound volume than the sound volume of the speech of the user may be performed in the first mode. In addition, in a case in which the speech speed of the user is excessively low, for example, feedback through a sound output at a higher speed than the speech speed of the user may be performed in the first mode.

Figure 4:
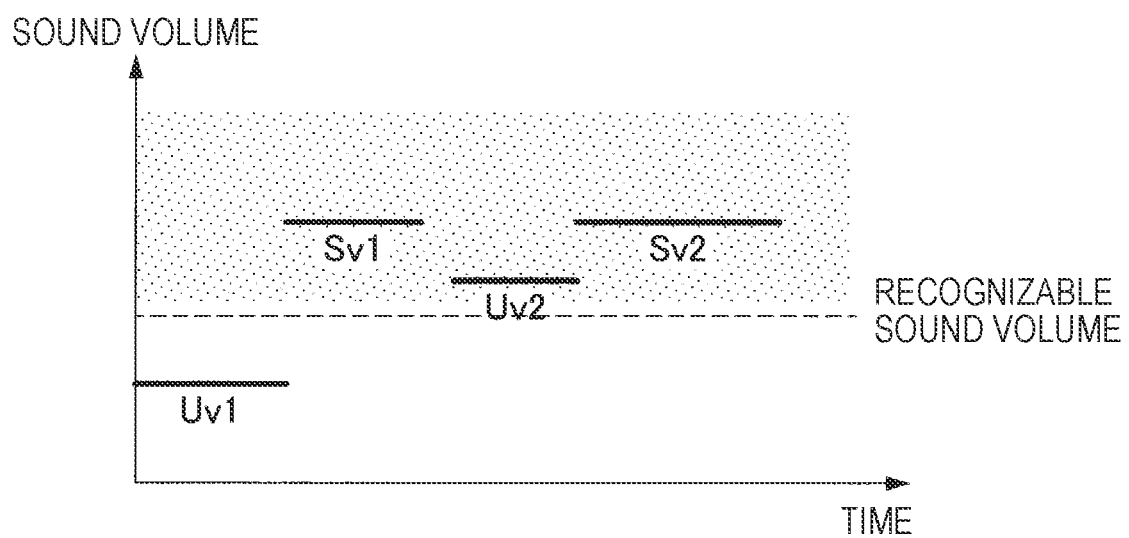
FIG. 4 is a diagram illustrating an example of dialog between the input and output terminal and a user according to the embodiment of the present disclosure.

FIG. 4 is a diagram illustrating an example of dialog between the user and the input and output terminal 10 using implicit feedback. In FIG. 4, the horizontal axis represents time elapse while the vertical axis represents loudness of the sound volume of the speech. Here, the unit of the time elapse in relation to the horizontal axis may be milliseconds (msec), for example. In addition, the units of the sound volume of the speech in relation to the vertical axis may be decibels (dB), for example, for example. In the example illustrated in FIG. 4, the user performs speech Uv1 first. Here, speech content of the speech Uv1 may be an inquiry "What is your schedule for tomorrow?", for example. The speech sound volume of the speech Uv1 in the example may be 45 dB, for example. However, since the speech Uv1 is speech performed with a smaller sound volume than a recognizable sound volume, it is difficult for the information processing apparatus 30 to recognize the speech Uv1. Therefore, the information processing apparatus 30 causes the input and output terminal 10 to output a system output Sv1 with the recognizable sound volume as implicit feedback. Here, the speech content of the system output Sv1 may be for asking back "How may I help you?", for example. In addition, the system output Sv1 at this time may be 60 dB, for example.

Next, the user who has received the system output Sv1 as the implicit feedback makes an inquiry again through speech Uv2. The speech content of the speech Uv2 may be an inquiry "Is there any schedule for tomorrow?", for example. In addition, the speech sound volume of the speech Uv2 may be 45 dB, for example, in this example. That is, the speech Uv2 of the user is performed with a larger sound volume than that of the speech Uv1 by receiving the system output Sv1 as the implicit feedback, and the sound volume is greater than the recognizable sound volume in the example in FIG. 4. Therefore, the speech Uv2 is recognized by the information processing apparatus 30, and the input and output terminal 10 outputs a system output Sv2 as a result of executing an application on the basis of the recognized speech Uv2. Here, the system output Sv2 may be a retrieval result in relation to a schedule of the user, for example, "You have a schedule to go to a hospital in the afternoon tomorrow." Note that the system output Sv2 at this time may be performed with a sound volume that is equivalent to that of the system output Sv1, for example.

Note that although the speech of the user is performed first in the example illustrated in FIG. 4, it is also possible to lead the sound volume of the speech of the user by the input and output terminal 10 presenting, as an example, a system output with a recognizable sound volume first in a case in which the input and output terminal 10 performs a sound output first.

As described above, feedback of encouraging the user to improve the speech style is performed by presenting, as an example, a style with high recognition accuracy that the user is expected to take, in the first mode in which implicit feedback is performed.

(Explicit Feedback)

Meanwhile, the explicit feedback may be feedback indicating a direct improvement method in response to the speech style of the user. That is, an improvement method for enhancing recognition accuracy of the input and output terminal 10 may be presented directly to the user by the explicit feedback unlike the implicit feedback in which a style of an output from the input and output terminal 10 is caused to change. Therefore, a method of improving the speech that the user can employ is specifically presented in order to recognize the speech of the user, in the second mode in which the explicit feedback is performed. In a case in which the sound volume of the speech of the user is small, for example, a sound output "Please speak louder." may be performed in the second mode. In addition, in a case in which the speech speed of the user is excessively high, for example, a sound output "Please speaker more slowly." may be performed in the second mode. As described above, the feedback of encouraging the user to improve the speech style is performed by clearly presenting an improvement means that the user can employ, in the second mode in which the explicit feedback is performed.

To select the first mode or the second mode described above in accordance with information related to recognition of speech of the user, which includes a speech style of the user, is one of features of the information processing apparatus 30 according to the embodiment. As described above, there is a possibility that the explicit feedback impair an impression of the user on the apparatus, and there is a possibility that dialog becomes unnatural if the explicit feedback is used often. Meanwhile, although the implicit feedback can realize more natural dialog that is close to dialog between persons in comparison to the explicit feedback, an effect of improving the speech style is expected to be lower than that of the explicit feedback.

In consideration of the aforementioned points, the information processing apparatus 30 according to the embodiment employs the first mode in which the implicit feedback is performed as a basis and performs control of switching the first mode to the second mode in which the explicit feedback is performed, in accordance with a situation. It is possible to realize more natural dialog with the user and to improve accuracy of the recognition of the speech of the user by the information processing apparatus 30 performing the control.

<<2.2. Examples of Implicit Feedback>>

Figure 5:
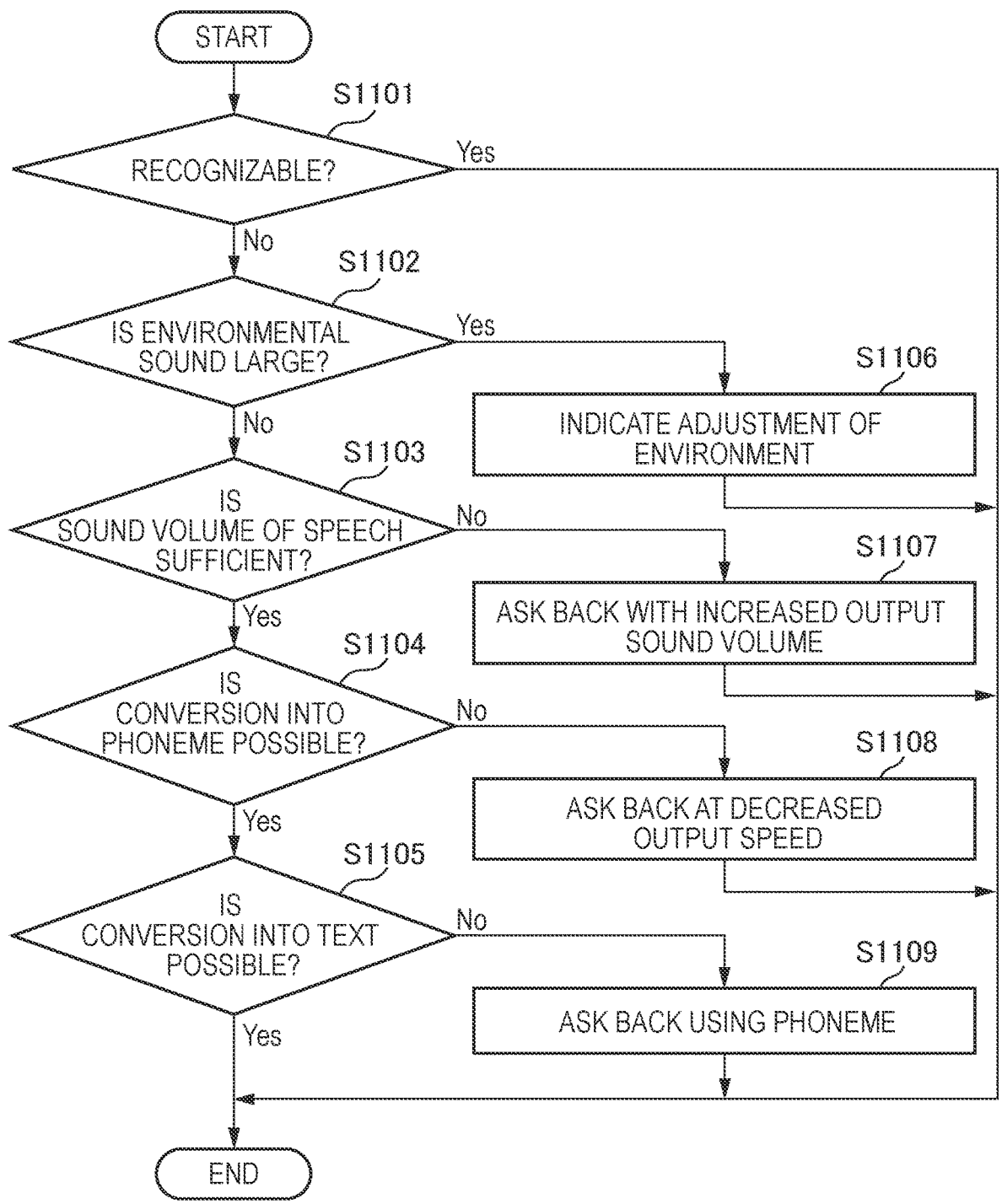
FIG. 5 is a diagram illustrating a flow for control of implicit feedback according to the embodiment.

Next, a specific example of implicit feedback according to the embodiment will be described. In the embodiment, a variety of types of implicit feedback may be performed in accordance with a speech style of the user. FIG. 5 is a flowchart illustrating a flow for control of implicit feedback performed by the output control unit 360 according to the embodiment.

Referring to FIG. 5, the output control unit 360 determines whether or not it has been possible to recognize the speech of the user first (S1101). At this time, the output control unit 360 may acquire a result of recognition from the sound recognition unit 330 and then make determination. If the output control unit 360 determines that the speech of the user has been recognized in Step S1101 (S1101: Yes), the output control unit 360 ends the control related to the implicit feedback and moves on to processing of an application based on the recognized sound.

Meanwhile, if the output control unit 360 determines that the speech of the user has not been recognized in Step S1101 (S1101: No), then the output control unit 360 compares the sound volume of the speech of the user with the sound volume of the environmental sound (S1102). At this time, the output control unit 360 may make determination on the basis of a result of analysis performed by the sound analysis unit 320. If the output control unit 360 determines that the sound volume of the environmental sound exceeds the sound volume of the speech of the user in Step S1102 (S1102: Yes), the output control unit 360 generates feedback information for proposing adjustment of an environment (S1106).

The aforementioned feedback for proposing adjustment of the environment may be a command for causing sound "Surrounding sound is loud", for example. In this manner, feedback of allowing the user to be aware of an improvement in the speech as well as a feedback in a style with high recognition accuracy that the user is expected to take may be included in the implicit feedback according to the embodiment.

Meanwhile, if the output control unit 360 determines that the sound volume of the speech of the user is greater than the sound volume of the environmental sound in Step S1102 (S1102: No), then the output control unit 360 determines whether or not the sound volume of the speech of the user is sufficiently large to be recognized (S1103). That is, the output control unit 360 determines whether or not a reason that the speech of the user has not been able to be recognized is the sound volume of the speech of the user.

Here, in a case in which the output control unit 360 determines that the sound volume of the speech of the user has not been sufficient (S1103: No), the output control unit 360 generates feedback information that is output as sound with a larger sound volume than the sound volume of the speech of the user (S1107). The feedback information may be a command for asking a question back with a larger sound volume than the sound volume of the speech of the user, for example.

Meanwhile, in a case in which the output control unit 360 determines that the sound volume of the speech of the user has been sufficient in Step 1103 (S1103: Yes), then the output control unit 360 determines whether or not the speech of the user has been able to be converted into phoneme (S1104). That is, the output control unit 360 determines whether or not the reason that the speech of the user has not been able to be recognized is the speech speed or the pronunciation clearness of the user.

Here, in a case in which the output control unit 360 determines that the speech of the user has not been able to be converted into phoneme (S1104: No), the output control unit 360 generates feedback information that is output as sound at a lower speed than the speech speed of the user (S1108). The feedback information may be a command for asking a question again at a lower speed than the speech speed of the user, for example. In addition, the feedback information may be a command for causing a sound output to be performed by clearly pronouncing changes in a pitch, a voice tone, and the like.

Meanwhile, in a case in which the output control unit 360 determines that the speech of the user has been able to be converted into phoneme in Step S1104 (S1104: Yes), then the output control unit 360 determines whether or not it has been possible to convert the speech of the user into a text (S1105). That is, the output control unit 360 determines whether or not the information converted into phoneme on the basis of the speech of the user has been recognized as words.

Here, in a case in which the output control unit 360 determines that the speech of the user has not been recognized as words (S1105: No), the output control unit 360 generates feedback information that is output as sound by using the sound converted into phoneme (S1109). The feedback information may be a command for causing a question "Is it OO?" to be asked back by using information of the sound converted into phoneme, for example.

The example of the implicit feedback according to the embodiment has been described above. As described above, the information processing apparatus 30 according to the embodiment can cause the input and output terminal 10 to execute a variety of types of implicit feedback in accordance with information related to recognition of the speech of the user. It is possible to realize more natural dialog that is closer to that between persons by the information processing apparatus 30 performing the control.

<<2.3. Switching of Modes Related to Feedback>>

Next, selection of a mode related to feedback performed by the output control unit 360 according to the embodiment will be described. As described above, the information processing apparatus 30 according to the embodiment can select a feedback mode in response to a speech style of the user in accordance with the information related to the recognition of the speech of the user. Here, user information, content information, environment information, and device information may be included in the information related to the recognition of the speech of the user, for example.

The aforementioned user information is information related to the user and may be a speech style, speech content, attribute information, emotion information, and the like of the user, for example. The output control unit 360 according to the embodiment can select a feedback mode in response to the speech style of the user in accordance with the user information.

In addition, the aforementioned content information may be information related to an application to be processed after recognizing the speech of the user. Here, the content information may include information related to a type or a specification of the application, for example. The output control unit 360 according to the embodiment can select a feedback mode in response to the speech style of the user in accordance with the content information. The output control unit 360 can select the first mode for an application that is adapted mainly for the purpose of conversation with the user and select the second mode for an application that is adapted mainly for the purpose of retrieving information.

In addition, the aforementioned environment information may be information related to a surrounding environment of the user and the input and output terminal 10. Information about detection of persons other than the user, information about environmental sound, and the like may be included in the environment information, for example. The output control unit 360 according to the embodiment can select a feedback mode in response to the speech style of the user in accordance with the environment information.

In addition, the aforementioned device information may be information related to a type or a specification of the input and output terminal 10. The output control unit 360 according to the embodiment can select a feedback mode in response to the speech style of the user in accordance with the device information. The output control unit 360 can select the first mode in a case in which the input and output terminal 10 is an agent adapted mainly for the purpose of conversation with the user and select the second mode in a case in which the input and output terminal 10 is a device that is used in a business-like or mechanical manner, for example.

The information related to the recognition of the speech of the user has been described above. As described above, the information processing apparatus 30 according to the embodiment can perform control such that the first mode in which implicit feedback is performed is employed as a basis and the first mode is switched to the second mode in which explicit feedback is performed in accordance with a situation. Hereinafter, conditions under which the output control unit 360 switches the mode related to feedback will be described by listing specific examples.

(Selection of Mode Based on Number of Times Recognition has been Attempted)

First, selection of a mode based on the number of times recognition has been attempted will be described. The output control unit 360 according to the embodiment can select the second mode in which explicit feedback is performed on the basis of an event in which the speech of the user has not been recognized within a predetermined number of times. Note that the aforementioned number of times may be defined in various manners in accordance with specifications of the system and the application. The predetermined number of times according to the embodiment may be the number of times the recognition has not been made although inputs related to the speech of the user have been detected (the number of times of certification failures). Alternatively, the predetermined number of times may be the number of times an input stand-by state related to recognition has experienced time-out (the number of times of time-out). Alternatively, the predetermined number of times may be the number of times the user has performed speech (the number of times of speech). Further, the predetermined number of times may be the total number of times of the aforementioned examples. Hereinafter, the aforementioned control will be described in detail with reference to FIGS. 6 and 7. Note that a case in which the sound volume of the speech of the user is determined will be described as an example in the following description.

First, sound volume levels of a sound output according to the embodiment will be described with reference to FIG. 6. FIG. 6 is a diagram for describing sound volume levels of a sound output from the sound output unit 130 of the input and output terminal 10. In the example illustrated in FIG. 6, the sound volume levels of the sound output are defined in three stages, namely levels 1 to 3, and the sound volume may increase as the numerical value of the level increases. Here, the level 1 may be an initial setting value of the sound output from the sound output unit 130. A sound volume range at the level 1 may be from 0 dB to 50 dB, for example. In a case in which the speech of the user has been recognized normally, the input and output terminal 10 may perform the subsequent response with the sound volume at the level 1. In addition, the level 2 may be defined as a sound volume that is larger than that at the level 1 by one stage. A sound volume range may be from 51 dB to 70 dB, for example. In addition, the level 3 is a larger sound volume than that at the level 2 by one stage and may be defined as the maximum sound volume for implicit feedback. A sound volume range at the level 3 may be defined to be from 71 dB to 100 dB or equal to or greater than 71 dB, for example.

Figure 7:
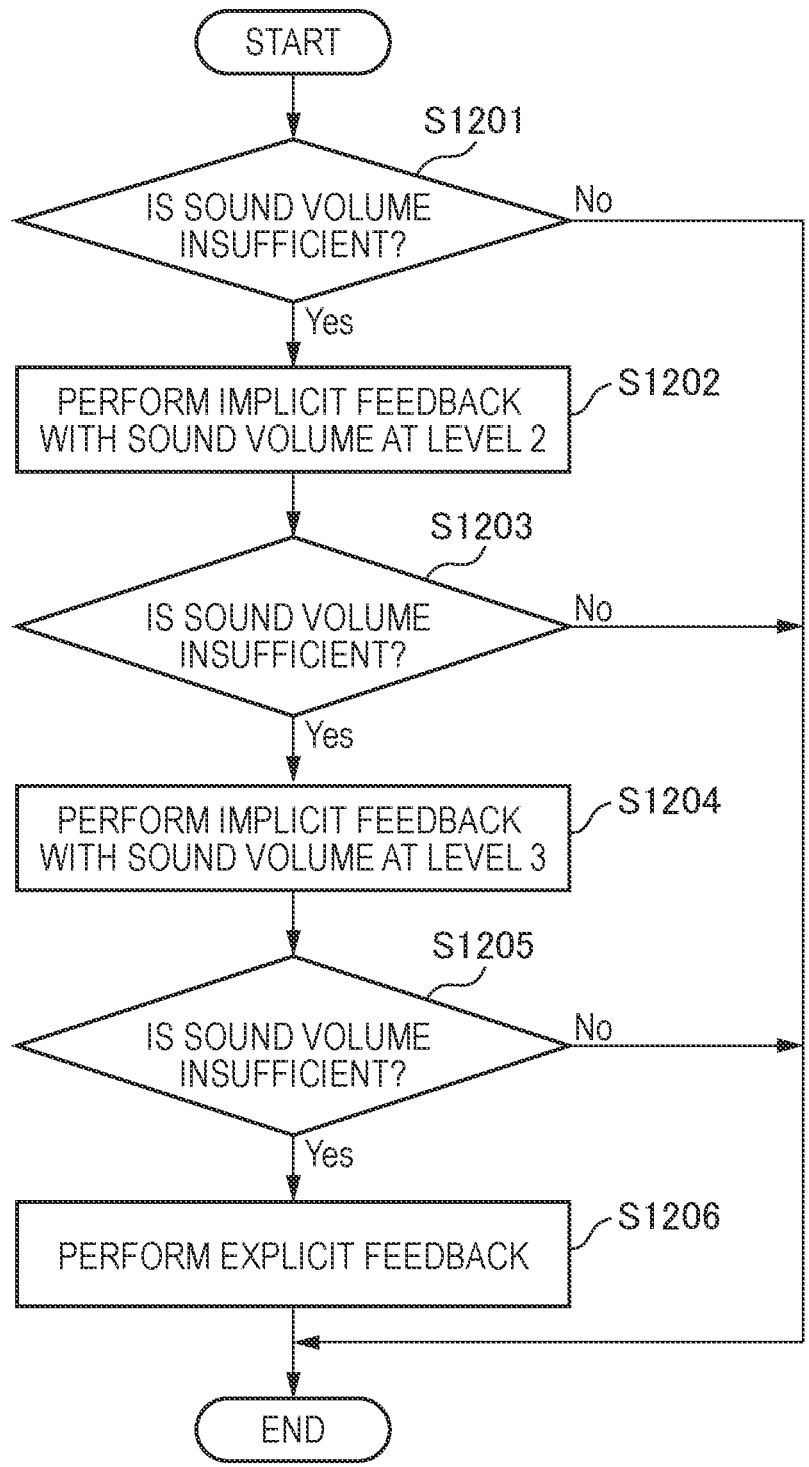
FIG. 7 is a diagram illustrating a flow for control of feedback based on the number of times recognition is attempted according to the embodiment.

Next, selection of the second mode based on the number of times recognition has been attempted will be described with reference to FIG. 7. FIG. 7 is a flowchart illustrating a flow for control performed by the output control unit 360 based on the number of times recognition has been attempted. First, the output control unit 360 determines whether or not the sound volume of the speech of the user acquired from the input and output terminal 10 is insufficient as a sound volume for recognition (S1201).

Here, in a case in which the sound volume of the speech of the user is sufficient for recognition (S1201: No), the output control unit 360 ends the determination processing related to the sound volume of the speech of the user. Meanwhile, in a case in which the sound volume of the speech of the user is insufficient (S1201: Yes), the output control unit 360 generates feedback information for causing implicit feedback to be executed with the sound volume at the level 2 illustrated in FIG. 6 (S1202). That is, the output control unit 360 causes the input and output terminal 10 to execute the implicit feedback with a sound volume that is at a higher level than that of the sound volume of the speech of the user by one stage.

If the speech of the user is acquired again after the implicit feedback is executed in Step S1202, the output control unit 360 determines again whether or not the sound volume of the acquired speech of the user is insufficient as the sound volume for recognition (S1203). Here, in a case in which the sound volume of the speech of the user is sufficient for recognition (S1203: No), the output control unit 360 ends the determination processing related to the sound volume of the speech of the user.

Meanwhile, in a case in which the sound volume of the speech of the user is in sufficient again (S1203: Yes), the output control unit 360 generates feedback information for causing implicit feedback to be executed with the sound volume at the level 3 illustrated in FIG. 6 (S1204). That is, the output control unit 360 causes the input and output terminal 10 to execute the implicit feedback with the set maximum sound volume.

If the speech of the user is acquired again after the implicit feedback is executed in Step S1204, the output control unit 360 determines again whether or not the sound volume of the acquired speech of the user is insufficient as the sound volume for recognition (S1205). Here, in a case in which the sound volume of the speech of the user is sufficient for recognition (S1205: No), the output control unit 360 ends the determination processing related to the sound volume of the speech of the user.

Meanwhile, in a case in which the sound volume of the speech of the user is insufficient again (S1205: Yes), the output control unit 360 generates feedback information for causing explicit feedback to be executed (S1206). That is, the output control unit 360 determines that the implicit feedback does not lead to an improvement in the speech style of the user and causes the input and output terminal 10 to execute explicit feedback. The input and output terminal 10 may perform a sound output "Please speak louder", for example, for the user under control performed by the output control unit 360.

As described above, the output control unit 360 according to the embodiment can select the second mode in which the explicit feedback is performed, on the basis of the number of times the recognition has been attempted. It is possible to employ natural dialog through implicit feedback as a basis and to improve accuracy of recognition in a case in which the speech of the user is not recognized within the predetermined number of times by the aforementioned control performed by the output control unit 360.

Note that the case in which the sound volume levels are defined as three stages and the number of times the recognition has been attempted is three has been described as an example in the above description. However, the selection of the second mode based on the number of times the recognition has been attempted according to the embodiment is not limited to such an example. The levels of the sound volume and the number of times the recognition has been attempted may be appropriately changed. In addition, the case in which the sound volume of the speech of the user in the speech style of the user is determined has been described as an example in the above description. However, the selection of the second mode based on the number of times the recognition has been attempted according to the embodiment is not limited to such an example. The output control unit 360 can also determine the speech speed or speech clearness of the user and select the second mode.

(Selection of Mode Based on Degree of Change in Speech Style)

Figure 8:
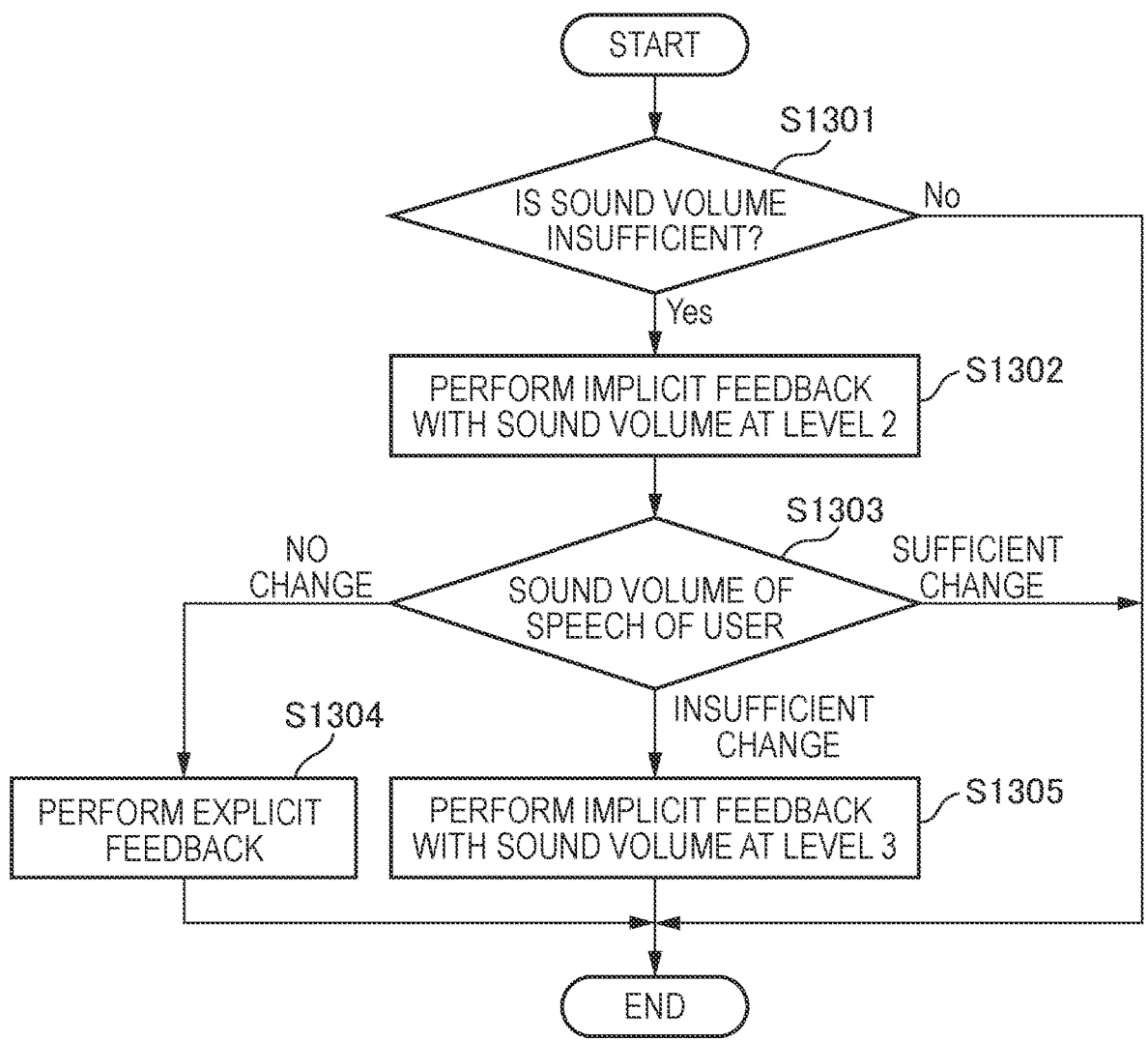
FIG. 8 is a diagram illustrating a flow for control of feedback based on a decree of change in speech modes according to the embodiment.

Next, selection of a mode based on a degree of a change in the speech style of the user will be described. The output control unit 360 according to the embodiment can select the second mode on the basis of an event in which no improvement has been recognized in the speech style of the user who has received implicit feedback. Hereinafter, the aforementioned control will be described in detail with reference to FIG. 8. Note that a case in which the sound volume of the speech of the user is determined will be described as an example in the following description.

First, the output control unit 360 determines whether or not the sound volume of the speech of the user acquired from the input and output terminal 10 is insufficient as the sound volume for recognition (S1301). Here, in a case in which the sound volume of the speech of the user is sufficient for recognition (S1301: No), the output control unit 360 ends the determination processing related to the sound volume of the speech of the user. Meanwhile, in a case in which the sound volume of the speech of the user is insufficient (S1301: Yes), the output control unit 360 generates feedback information for causing implicit feedback to be executed with the sound volume at the level 2 illustrated in FIG. 6 (S1302).

If the speech of the user is acquired again after the implicit feedback is executed in Step S1302, the output control unit 360 compares the sound volume of the acquired speech of the user with the sound volume of the previous speech and determines a degree of a change in the speech sound volumes (S1303). At this time, the output control unit 360 can make the aforementioned determination by acquiring a result of analyzing the previous speech style of the user, which is stored in the state storage unit 340.

Here, in a case in which the sound volume of the speech of the user has sufficiently changed to recognizable loudness (S1303: sufficient change), the output control unit 360 ends the determination processing related to the sound volume of the speech of the user. Meanwhile, in a case in which the sound volume of the speech of the user has not reached the recognizable loudness although there has been a change in the sound volume in Step S1303 (S1303: insufficient change), the output control unit 360 generates feedback information for causing implicit feedback to be executed with the sound volume at the level 3 illustrated in FIG. 6 (S1305). In addition, in a case in which there has been no change in the sound volume of the speech of the user or in a case in which the sound volume of the speech has become small in Step S1303 (S1303: no change), the output control unit 360 determines that the implicit feedback does not lead to an improvement in the speech style of the user and causes the input and output terminal 10 to execute explicit feedback.

As described above, the output control unit 360 according to the embodiment can select the second mode in which the explicit feedback is performed, on the basis of a degree of a change in the speech style of the user. It is possible to improve accuracy of recognition even in a case in which the user does not react against the implicit feedback, by the aforementioned control performed by the output control unit 360.

Note that the case in which the sound volume of the speech of the user in the speech style of the user is determined has been described as an example in the above description. However, the selection of the second mode based on a degree of a change in the speech style of the user according to the embodiment is not limited to such an example. The output control unit 360 can also determine the speech speed or the speech clearness of the user and select the second mode.

(Selection of Mode Based on Speech Position or Speech Direction)

Next, selection of a mode based on the speech position or the speech direction of the user will be described. The output control unit 360 according to the embodiment can select the second mode on the basis of an event in which no improvement has been observed in the speech position or the speech direction of the user who has received implicit feedback. In this manner, the speech position or the speech direction of the user may be included in the speech style of the user according to the embodiment.

Figure 9:
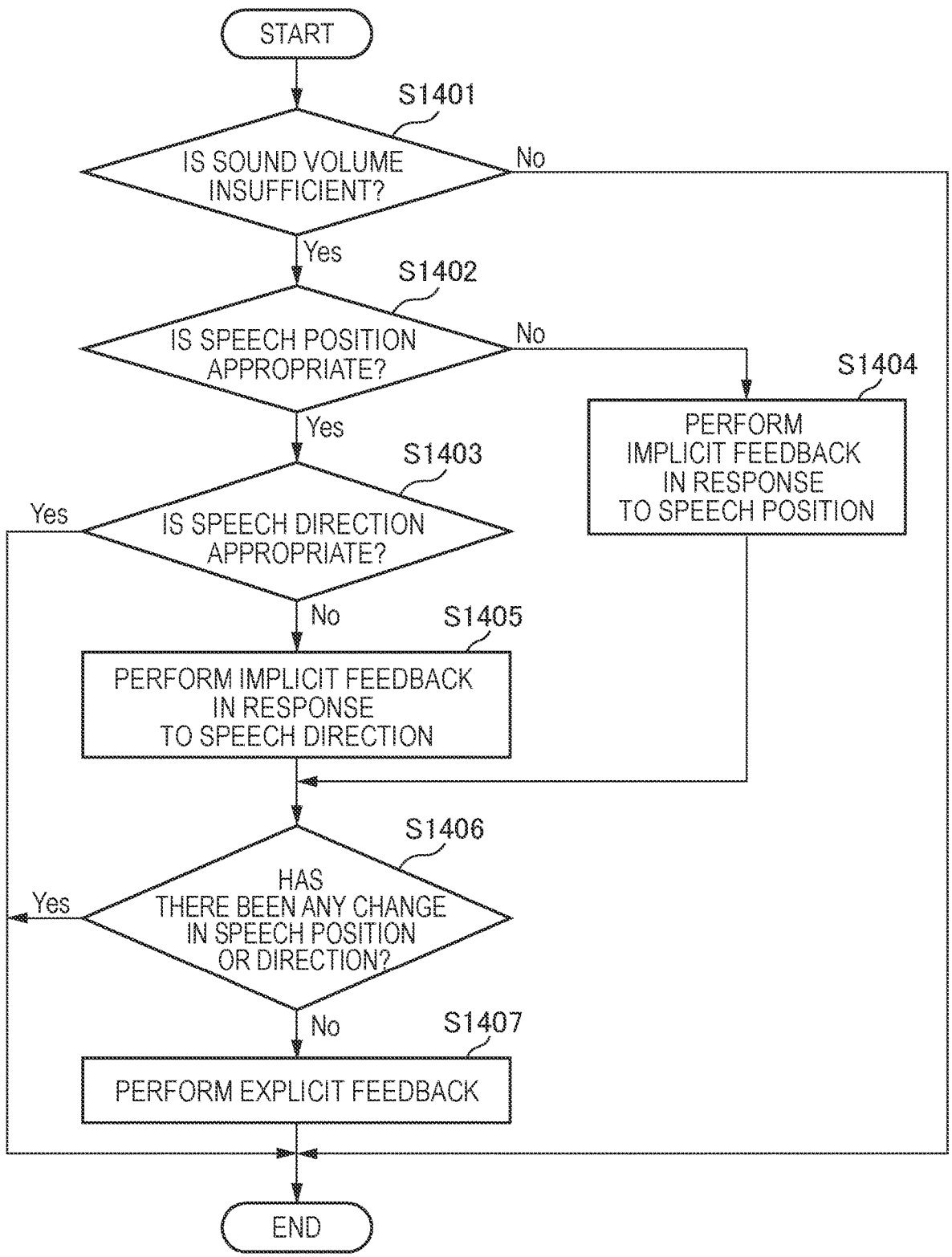
FIG. 9 is a diagram illustrating a flow for control of feedback performed on a speech position and a speech direction according to the embodiment.

FIG. 9 is a flowchart illustrating a flow for control performed by the output control unit 360 based on the speech position or the speech direction of the user. First, the output control unit 360 determines whether or not the sound volume of the speech of the user acquired from the input and output terminal 10 is insufficient as the sound volume for recognition (S1401). Here, in a case in which the sound volume of the speech of the user is insufficient for recognition (S1401: No), the output control unit 360 ends the determination processing related to the speech position and the speech direction of the user.

Meanwhile, in a case in which the sound volume of the speech of the user is insufficient (S1401: Yes), then the output control unit 360 determines whether or not the speech position of the user is appropriate (S1402). That is, the output control unit 360 determines whether or not the insufficiency of the sound volume of the speech is caused by the speech position. At this time, the output control unit 360 can make the aforementioned determination on the basis of information about the speech position of the user estimated by the position detection unit 350.

In a case in which the output control unit 360 determines that the speech position of the user is not appropriate in Step S1402 (S1402: No), the output control unit 360 generates feedback information for causing implicit feedback for the speech position of the user to be executed (S1404). The feedback information may be a command for causing the input and output terminal 10 to output sound "Your voice hears from a far location", for example.

Meanwhile, in a case in which the output control unit 360 determines that the speech position of the user is appropriate in Step S1402 (S1402: Yes), then the output control unit 360 determines whether or not the speech direction of the user is appropriate (S1403). That is, the output control unit 360 determines whether or not insufficiency of the sound volume of the speech is caused by the speech direction. At this time, the output control unit 360 can make the aforementioned determination on the basis of information about the speech direction of the user estimated by the position detection unit 350.

In a case in which the output control unit 360 determines that the speech direction of the user is appropriate in Step S1403 (S1403: Yes), the output control unit 360 ends the determination processing related to the speech position and the speech direction of the user.

Meanwhile, in a case in which the output control unit 360 determines that the speech direction of the user is not appropriate in Step S1403 (S1403: No), the output control unit 360 generates feedback information for causing implicit feedback in response to the speech direction of the user to be executed (S1405). The feedback information may be a command for causing the input and output terminal 10 to output sound "Are you talking to me?", for example. In addition, the feedback information generated in Step S1405 may be designation of a speaker to output the sound. In a case in which the sound output unit 130 of the input and output terminal 10 includes a plurality of speakers, for example, it is possible to allow the user to be aware of the speech direction by limiting the speaker to output the implicit feedback. In addition, in a case in which the sound output unit 130 includes a microphone array, information for setting directionality of the microphone array may be included in the aforementioned feedback information.

If information related to the recognition of the speech of the user is acquired again after the implicit feedback is executed in Step S1404 or Step S1405, the output control unit 360 determines whether or not the speech position or the speech direction of the user has been improved (S1406). Here, in a case in which the output control unit 360 determines that the speech position or the speech direction of the user has been improved (S1406: Yes), the output control unit 360 ends the determination processing related to the speech position and the speech direction.

Meanwhile, in a case in which the output control unit 360 determines that the speech position or the speech direction of the user has not been improved (S1406: No), the output control unit 360 generates feedback information for causing explicit feedback in response to the speech position or the speech direction of the user to be executed. The feedback information may be a command for causing the input and output terminal 10 to output sound "Please come close to the microphone" or "please speak to the microphone", for example.

As described above, the output control unit 360 according to the embodiment can select the second mode in which explicit feedback is performed, on the basis of the speech position or the speech direction of the user. Note that the case in which the sound volume of the speech of the user is insufficient has been described above, the selection of the second mode based on the speech position or the speech direction of the user may be controlled in consideration of the sound volume of the environmental sound. For example, a case in which the input and output terminal 10 is an agent incorporated in a building and the sound input unit 110 and the sound output unit 130 are provided in a plurality of rooms in the building is assumed. At this time, in a case in which environmental sound in a room where the user has performed speech is loud and it is difficult to recognize the speech of the user, the information processing apparatus 30 may generate feedback information for guiding the user to another room. That is, the information processing apparatus 30 can guide the user such that the speech will be performed using another microphone that is different from the microphone from which the speech of the user has been detected. In this manner, it is possible to realize a variety of types of feedback in accordance with the specification of the input and output terminal 10 by the output control unit 360 controlling the feedback based on the speech position or the speech direction of the user.

(Selection of Mode Based on Analysis of Speech Style)

Next, selection of a mode based on analysis of the speech style of the user will be described. The output control unit 360 according to the embodiment can control the feedback mode on the basis of a result of analyzing the speech style of the user. The sound volume of the speech, the speech speed, the sound tone of the speech, the pronunciation clearness, the speech position, the speech direction, the speech content, and the environmental sound may be included in the aforementioned speech style.

—Selection of Mode Based on Attribute Information of User—

First, selection of a mode based on attribute information of the user will be described. The output control unit 360 according to the embodiment can control the feedback mode on the basis of the attribute information of the user. The attribute information of the user may be information obtained by the sound analysis unit 320 analyzing the speech style of the user or information obtained from a result of recognizing sound by the sound recognition unit 330. In addition, profile information such as a gender and an age of the user and information such as a used language and a trend of the speech style may be included in the attribute information of the user.

The output control unit 360 may select a feedback mode on the basis of the trend of the speech style of the user. In a case in which the user specified by the sound analysis unit 320 performing analysis has a trend that the sound volume of the speech is small, for example, the output control unit 360 may select the second mode with priority. In this manner, it is possible to expect to shorten a time until the speech of the user is recognized, by the output control unit 360 selecting the mode on the basis of the speech trend of the user.

In addition, the output control unit 360 may select the feedback mode on the basis of the setting performed by the user in relation to the mode. In a case in which the user can set the feedback mode in response to the speech, the output control unit 360 can set the feedback mode in accordance with the user's setting specified by the sound analysis unit 320 performing analysis.

In addition, the output control unit 360 may select the feedback mode on the basis of statistical information obtained from attribute information of a plurality of users. The output control unit 360 may acquire, by using specific attribute information as a key, a trend or the like of speech styles of a user group with the specific attribute and select the mode on the basis of the trend. The aforementioned control is effective especially in an environment in which the input and output terminal 10 is used by an unspecified large number of users.

—Selection of Mode Based on User's Emotion—

Next, selection of a mode based on a user's emotion will be described. The output control unit 360 according to the embodiment can control the feedback mode on the basis of the user's emotion. The user's emotion may be information obtained by the sound analysis unit 320 analyzing the speech style of the user.

The output control unit 360 may select the first mode on the basis of estimation that the user is in an excited state, for example. As described above, it is assumed that some users have an aversion to explicit feedback. Therefore, in a case in which it is estimated that the user is in the excited state, the output control unit 360 can reduce a concern that the user's emotion is offended by causing the input and output terminal 10 to perform implicit feedback.

—Selection of Mode Based on Speech Content—

Next, selection of a mode based on the speech content of the user will be described. The output control unit 360 according to the embodiment can control the feedback mode on the basis of the speech content of the user. The speech content of the user may be information obtained from a result of recognizing sound by the sound recognition unit 330.

The output control unit 360 may select the second mode on the basis of estimation that the speech content of the user includes privacy information, for example. There is a possibility that asking back using elements that have been able to be converted into phoneme or a text is performed in the implicit feedback according to the embodiment. Therefore, the output control unit 360 can set the second mode in order to prevent the privacy information from leaking to persons other than the user. In addition, it is possible to improve accuracy of recognition of the speech related to the privacy information and to end the dialog in a shorter time by the output control unit 360 performing the aforementioned control.

—Selection of Mode Based on Environment Information—

Next, selection of a mode based on environment information will be described. The output control unit 360 according to the embodiment can control the feedback mode on the basis of an event in which presence of a third person has been detected in the surroundings of the user. The detection of the third person may be information obtained from a result of detection performed by the position detection unit 350 or information obtained from a result of recognizing sound by the sound recognition unit 330.

The output control unit 360 may select the first mode on the basis of an event in which the presence of the third person has been detected in the surroundings of the user, for example. As described above, some users feel from the explicit feedback that the apparatus gives an order in some cases. Such users are expected to have worse impression on the input and output terminal 10 by the surrounding person hearing the explicit feedback. Therefore, in a case in which the presence of the third person has been detected in the surroundings of the user, the output control unit 360 can reduce the concern that the user's emotion is offended by causing the input and output terminal 10 to perform implicit feedback.

<<2.4. Explicit Feedback to which Reason for Improvement is Added>>

The selection of a mode made by the output control unit 360 in relation to the feedback has been described above. Next, explicit feedback to which a reason for improvement is added according to the embodiment will be described. The output control unit 360 according to the present disclosure can cause the input and output terminal 10 to execute feedback, to which a reason for improvement is added, in the second mode in which explicit feedback is performed. It is possible to soften the expression of explicit feedback and to reduce a possibility that a user's emotion is offended, if the output control unit 360 controls the feedback such that the reason for improving the speech style is presented together to the user.

FIG. 10 is a flowchart illustrating a flow of adding a reason for improvement by the output control unit 360. In the example illustrated in FIG. 10, the output control unit 360 acquires a result of analyzing speech by the sound analysis unit 320 and determines the number of detected sound types (S1501). That is, the output control unit 360 determines whether or not sound of a plurality of persons is included in the collected information.

In a case in which the output control unit 360 determines that only sound of one person has been detected in Step S1501 (S1501: sound of one person), the output control unit 360 sets a reason 1 for improvement in the feedback information (S1502). Here, the reason 1 for improvement set in the feedback information may be additional information such as "Because surrounding sound is excessively loud", for example.

In addition, in a case in which the output control unit 360 determines that sound of a plurality of persons has been detected in Step S1501 (S1501: sound of a plurality of persons), the output control unit 360 sets a reason 2 for improvement in the feedback information (S1503). Here, the reason 2 for improvement set in the feedback information may be additional information "Because another person is likely to be speaking", for example.

In addition, in a case in which it is difficult for the output control unit 360 to determine the number of sound types in Step S1501 (S1501: difficult to specify), the output control unit 360 sets a reason 3 for improvement in the feedback information (S1504). Here, the reason 3 for improvement in the feedback information may be additional information "Because it is a bit difficult to hear you", for example.

If some of the reasons for improvement is set in Steps S1502 to S1504, then the output control unit 360 generates feedback information for causing explicit feedback, to which the reason for improvement has been added, to be executed, and transmits the feedback information to the input and output terminal 10 (S1505). The feedback information generated in Step S1505 may be information of a combination of output information "Please speak a bit louder." and the reason for improvement, for example. In a case in which the reason 1 for improvement is set in Step S1502, for example, the information generated in Step S1505 may be output information "Please speak a bit louder because sound in the surroundings is too loud".

As described above, the output control unit 360 according to the embodiment can cause the input and output terminal 10 to execute feedback, to which the reason for improvement has been added, in the second mode in which the explicit feedback is performed. It is possible to soften the expression of the explicit feedback and to realize more natural dialog by the output control unit 360 performing the aforementioned control.

<<2.5. Additional Control of Feedback Through Visual Information>>

Next, addition of feedback through visual information according to the embodiment will be described. The output control unit 360 according to the embodiment can control feedback through visual information in addition to feedback through a sound output. In addition, the output control unit 360 can add feedback through visual information on the basis of an event in which the speech style of the user has not sufficiently changed. Hereinafter, the aforementioned control performed by the output control unit 360 will be described in detail with reference to FIG. 11.

First, the output control unit 360 determines whether or not the sound volume of the speech of the user is insufficient as the sound volume for recognition (S1601). Here, in a case in which the sound volume of the speech of the user is sufficient for recognition (S1601: No), the output control unit 360 ends the control related to the addition of the feedback through visual information. Meanwhile, in a case in which the sound volume of the speech of the user is insufficient (S1601: Yes), the output control unit 360 generates feedback information for causing implicit feedback to be executed with the sound volume at the level 2 illustrated in FIG. 6 (S1602).

If the speech of the user is acquired again after the implicit feedback in Step S1602 is executed, the output control unit 360 determines again whether or not the sound volume of the acquired speech of the user is insufficient as the sound volume for recognition (S1603). Here, in a case in which the sound volume of the speech of the user is sufficient for recognition (S1603: No), the output control unit 360 ends the control related to the addition of the feedback through visual information.

Meanwhile, in a case in which the sound volume of the speech of the user is insufficient again (S1603: Yes), the output control unit 360 generates feedback information for causing implicit feedback to be executed with the sound volume at the level 3 illustrated in FIG. 6 (S1604). In addition, the output control unit 360 generates feedback information for causing implicit feedback through visual information to be executed (S1605). The feedback information for causing the implicit feedback to be executed may be a command for causing the display unit 140 of the input and output terminal 10 to display text information that is similar to the feedback through a sound output, for example. In addition, the feedback information for causing the implicit feedback to be executed may be a command for causing feedback using an image or animation, which will be described later, to be executed.

If speech of the user is acquired again after the implicit feedback is executed in Steps S1604 and S1605, the output control unit 360 determines again whether or not the sound volume of the acquired speech of the user is insufficient as the sound volume for recognition (S1606). Here, in a case in which the sound volume of the speech of the user is sufficient for recognition (S1606: No), the output control unit 360 ends the control related to the addition of the feedback through visual information.

Meanwhile, in a case in which the sound volume of the speech of the user is insufficient again (S1606: Yes), the output control unit 360 generates feedback information for causing explicit feedback through a sound output to be executed (S1607). In addition, the output control unit 360 generates feedback information for causing explicit feedback through visual information to be executed (S1608).

As described above, the output control unit 360 according to the embodiment can control the feedback through visual information in addition to the feedback through a sound output. In addition, the output control unit 360 can add the visual feedback in a stepwise manner in a manner similar to that in the control of the feedback through a sound output. It is possible to improve accuracy of recognition while the implicit feedback using sound is still used as a basis, by the output control unit 360 performing the aforementioned control.

<<2.6. Examples of Feedback Through Visual Information>>

The control of the feedback through visual information according to the embodiment has been described above. Hereinafter, an example of feedback through visual information according to the embodiment will be described with reference to FIGS. 12 to 16. Letters, symbols, avatars, indicators, or a change in an image may be included in the aforementioned visual information.

(Implicit Feedback Through Indicators)

Figure 12A:
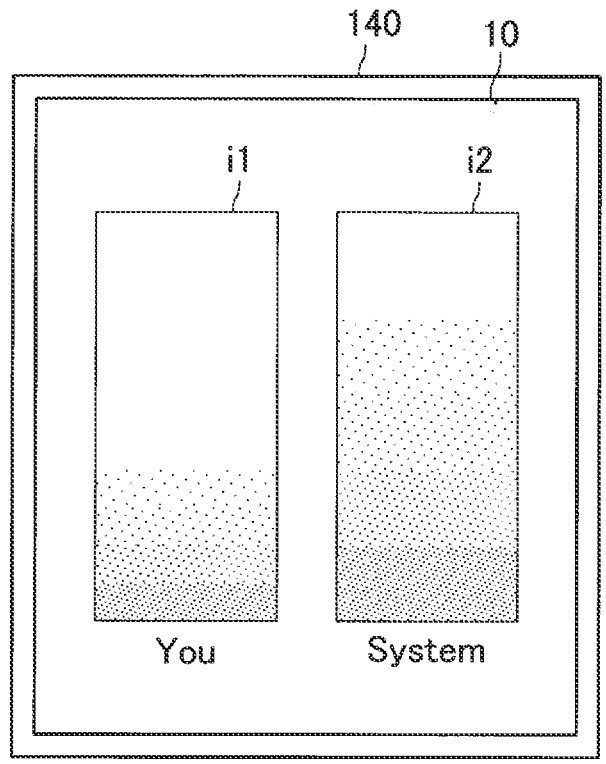
FIG. 12A is an example of feedback using an indicator according to the embodiment.

FIG. 12 is an example of indicators used for the implicit feedback through visual information according to the embodiment. Referring to FIG. 12A, two indicators i1 and i2 are displayed on the display unit 140 of the input and output terminal 10. Here, the indicator i1 may be an indicator indicating a sound volume the speech of the user. In addition, the indicator i2 may be an indicator indicating an output sound volume of the input and output terminal 10. The respective indicators i1 and i2 may be adapted such that proportions at which gradation occupies change toward the upper portion of the display unit 140 in accordance with a change in the sound volume of the speech of the user or the output sound volume of the input and output terminal 10. That is, the indicator i1 may be adapted such that the gradation expands toward the upper portion of the screen of the display unit 140 as the sound volume of the speech of the user increases, and the indicator i2 may be adapted such that the gradation expands toward the upper portion of the screen of the display unit 140 as the output sound volume of the input and output terminal 10 increases.

Figure 12B:
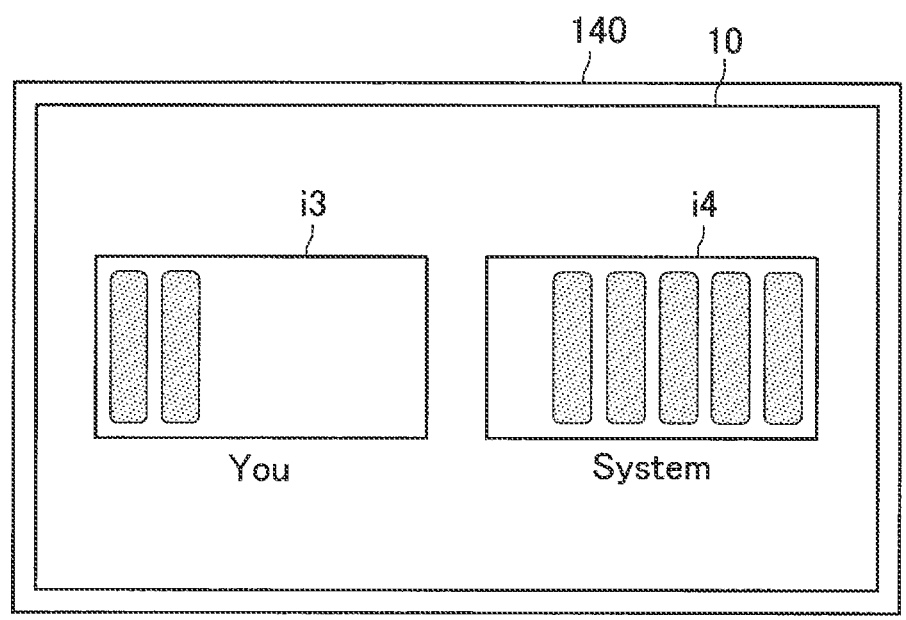
FIG. 12B is an example of feedback using an indicator according to the embodiment.

In addition, FIG. 12B is a diagram illustrating an example of another indicator. Referring to FIG. 12B, two indicators i3 and i4 are displayed on the display unit 140 of the input and output terminal 10. Here, the indicator i3 may be an indicator indicating the sound volume of the speech of the user. In addition, the indicator i4 may be an indicator indicating the output sound volume of the input and output terminal 10. The respective indicators i3 and i4 may be adapted such that the numbers of bars indicating the sound volume level change toward the center of the display unit 140 in accordance with a change in the sound volume of the speech of the user or output sound volume of the input and output terminal 10. That is, the indicator i3 may be adapted such that the number of bars increases toward the center of the screen of the display unit 140 as the sound volume of the speech of the user increases, and the indicator i4 may be adapted such that the number of bars increases toward the center of the screen of the display unit 140 as the output sound volume of the input and output terminal 10 increases.

The user can compare the output sound volume of the input and output terminal 10 with the sound volume of the speech of the user by checking the indicators displayed on the display unit 140. In this manner, an effect that the user recognizes that the sound volume of the speech is insufficient and improves the speech style is expected.

(Implicit Feedback Through Avatars in Response to Speech Direction)

Figure 13A:
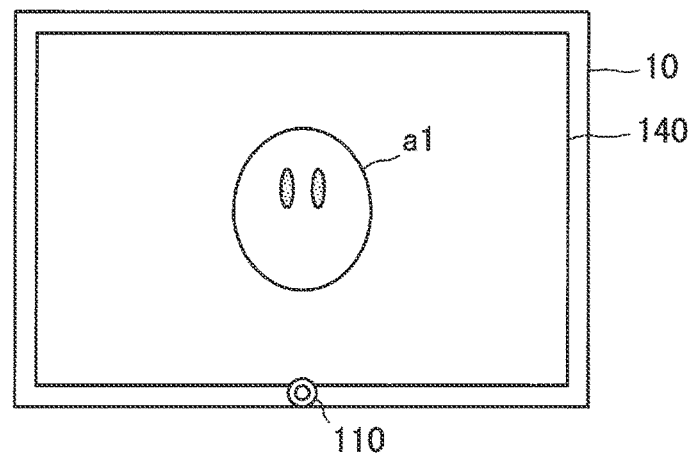
FIG. 13A is an example of feedback using an avatar according to the embodiment.

Next, an example of avatars used in implicit feedback through visual information according to the embodiment will be described with reference to FIG. 13. The avatars illustrated in FIG. 13 may be images or animations for performing implicit feedback in response to the speech direction of the user. Referring to FIG. 13A, an avatar 1 is displayed on the display unit 140 of the input and output terminal 10. In addition, the sound input unit 110 is arranged at a lower portion of the input and output terminal 10. Here, the avatar a1 may be an example of the avatar that is displayed in a case in which the speech direction of the user is appropriate.

Figure 13B:
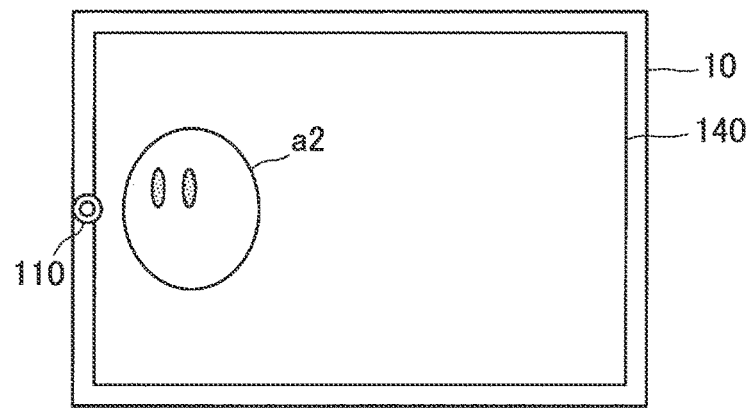
FIG. 13B is an example of feedback using an avatar according to the embodiment.

FIG. 13B is an example of the avatar displayed in a case in which the speech direction of the user is not appropriate. Referring to FIG. 13B, the sound input unit 110 is arranged on the left side of the display unit 140 from the observer's viewpoint unlike FIG. 13A. In addition, an avatar a2 is displayed on the left side of the display unit 140 from the observer's viewpoint, and a line of sight is directed to the sound input unit 110.

Figure 13C:
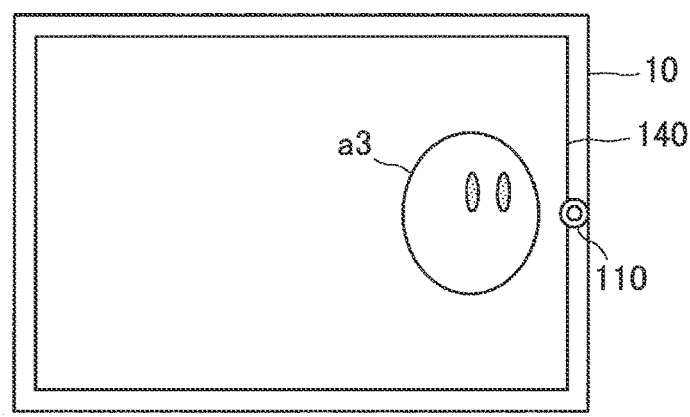
FIG. 13C is an example of feedback using an avatar according to the embodiment.

Next, reference will be made to FIG. 13C. FIG. 13C also illustrates an example of an avatar that is displayed in a case in which the speech direction of the user is not appropriate in a manner similar to that in FIG. 13B. Referring to FIG. 13C, the sound input unit 110 is arranged on the right side of the input and output terminal 10 from the observer's viewpoint unlike FIG. 13A. In addition, an avatar a3 is displayed on the right side of the display unit 140 from the observer's viewpoint, and a line of sight is directed to the sound input unit 110.

As described above, the implicit feedback is performed by the avatar indicating the position of the sound input unit 110 in the case in which the speech direction of the user is not appropriate in the example illustrated in FIG. 13. An effect that the speech direction of the user is improved by the user visually recognizing the image of the avatar or motion of the animation is expected.

(Implicit Feedback Using Graphics in Response to Speech Direction)

Figure 14A:
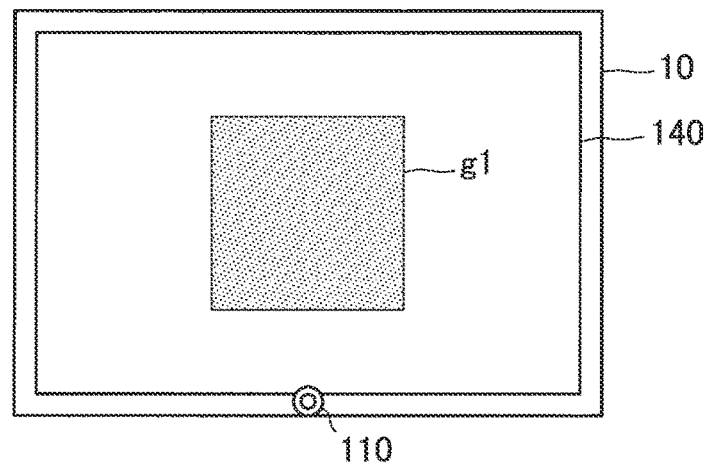
FIG. 14A is an example of feedback using a graphic according to the embodiment.

Next, an example of graphics used for implicit feedback through visual information according to the embodiment will be described with reference to FIG. 14. A graphic g1 illustrated in FIG. 14 may be an image or animation for performing implicit feedback in response to the speech direction of the user. Referring to FIG. 14A, the graphic g1 is displayed on the display unit 140 of the input and output terminal 10. In addition, the sound input unit 110 is arranged at a lower portion of the input and output terminal 10. Here, the graphic g1 may be an example of the graphic that is displayed in a case in which the speech direction of the user is appropriate.

Figure 14B:
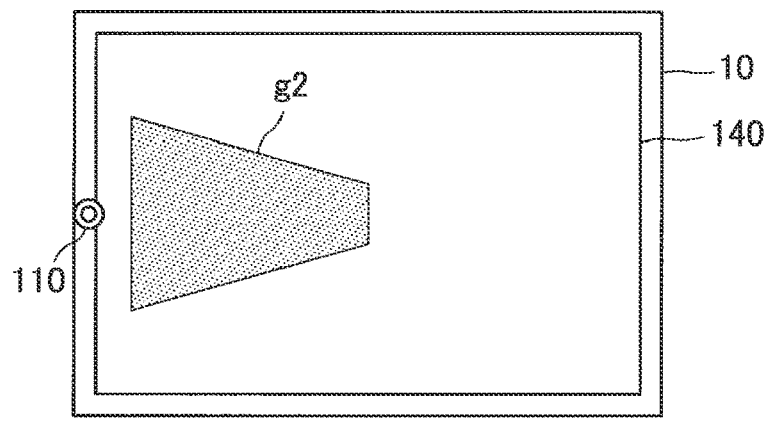
FIG. 14B is an example of feedback using a graphic according to the embodiment.

FIG. 14B is an example of a graphic that is displayed in a case in which the speech direction of the user is not appropriate. Referring to FIG. 14B, the sound input unit 110 is arranged on the left side of the input and output terminal 10 from the observer's viewpoint unlike FIG. 14A. In addition, a graphic g2 is displayed on the left side from the left side from the observer's viewpoint and is deformed to expand toward the side of the sound input unit 110.

Figure 14C:
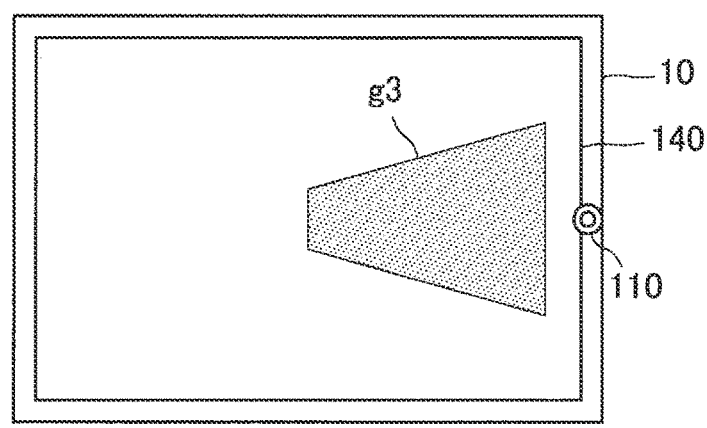
FIG. 14C is an example of feedback using a graphic according to the embodiment.

Next, reference will be made to FIG. 14C. FIG. 14C also illustrates an example of a graphic that is displayed in a case in which the speech direction of the user is not appropriate as in FIG. 14B. Referring to FIG. 14C, the sound input unit 110 is arranged on the right side of the input and output terminal 10 from the observer's viewpoint unlike FIG. 14A. In addition, a graphic g3 is displayed on the right side of the display unit 140 from the observer's viewpoint and is deformed to expand toward the side of the sound input unit 110.

As described above, implicit feedback by the graphic indicating the position of the sound input unit 110 is performed in the case in which the speech direction of the user is not appropriate in the example illustrated in FIG. 14. An effect that the speech direction of the user is improved by the user visually recognizing the image of the graphic or motion of the animation is expected. Note that although the example in which the shape and the display position of the graphic are caused to change has been described above, the position of the sound input unit 110 may be indicated by causing gradation of a color displayed on the entire screen of the display unit 140 to be changed.

(Implicit Feedback Through Avatars in Response to Speech Position)

Figure 15A:
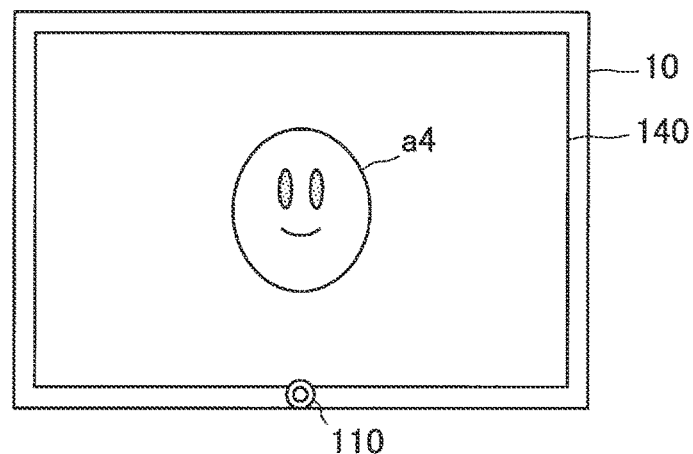
FIG. 15A is an example of feedback using an avatar according to the embodiment.

Next, an example of implicit feedback through avatars in response to a speech position will be described with reference to FIG. 15. Avatars illustrated in FIG. 15 may be an image or animation for performing implicit feedback in response to the speech position of the user. Referring to FIG. 15A, an avatar a4 is displayed on the display unit 140 of the input and output terminal 10. Here, the avatar a4 may be an example of an avatar that is displayed in a case in which the speech position of the user is appropriate.

Figure 15B:
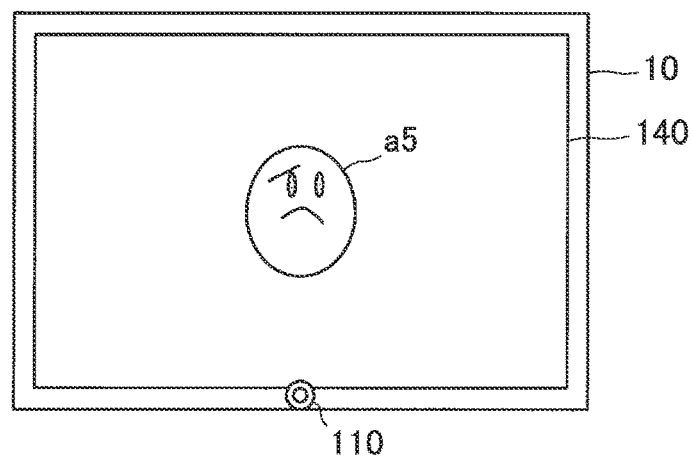
FIG. 15B is an example of feedback using an avatar according to the embodiment.

FIG. 15B is an example of an avatar that is displayed in a case in which the speech position of the user is not appropriate (in a case in which the distance is long). Referring to FIG. 15B, an avatar a5 is displayed to be smaller in comparison to the avatar a4, and it is possible to recognize that the facial expression has changed. In this manner, the implicit feedback in response to the speech position of the user is performed by causing the size and the facial expression of the avatar a5 to change in the example illustrated in FIG. 15B. Note that although the example in which the facial expression of the avatar a5 is caused to look unsatisfied in FIG. 15B, another facial expression may be used for the facial expression of the avatar a5. For example, the fact that the speech position of the user is far may be indicated by a line of sight of the avatar a5 indicating a far location.

Figure 15C:
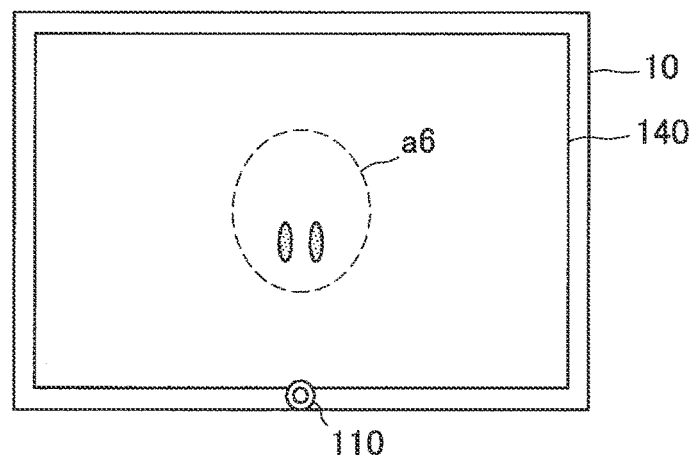
FIG. 15C is an example of feedback using an avatar according to the embodiment.

Next, reference will be made to FIG. 15C. FIG. 15C also illustrates an example of an avatar that is displayed in a case in which the speech position of the user is not appropriate as in FIG. 15B. Referring to FIG. 15C, it is possible to recognize that an avatar a6 is displayed to have a paler outline in comparison to the avatar a4. In this manner, the implicit feedback in response to the speech position of the user is performed by causing the strength of the outline of the avatar a6 to change in the example illustrated in FIG. 15C.

As described above, the implicit feedback is performed by the avatar indicating that the speech position of the user is not appropriate in the example illustrated in FIG. 15. An effect that the speech direction of the user is improved by the user visually recognizing the image of the avatar or motion of the animation is expected.

(Implicit Feedback Through Arrows in Response to Speech Direction and Speech Position)

Next, an example of implicit feedback through arrows in response to a speech direction or a speech position will be described with reference to FIG. 16. Graphics including the arrows illustrated in FIG. 16 may be an image or animation for performing implicit feedback in response to the speech direction or the speech position of the user.

Figure 16A:
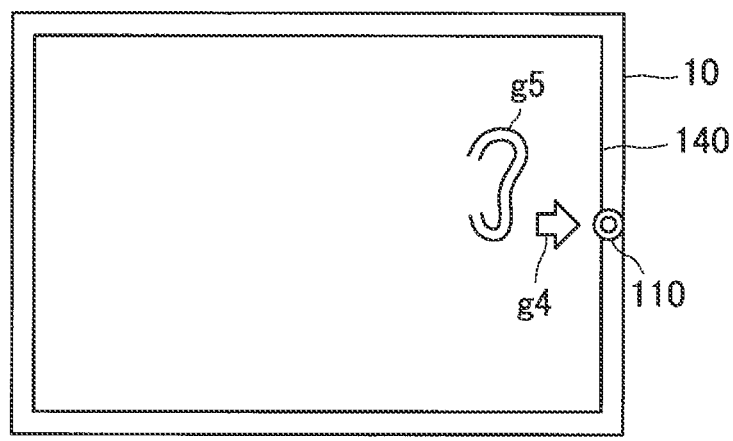
FIG. 16A is an example of feedback using a graphic according to the embodiment.

Referring to FIG. 16A, graphics g4 and g5 are displayed on the display unit 140 of the input and output terminal 10. Here, the graphic g4 is displayed as an arrow indicating the position of the sound input unit 110, and the graphic g5 is indicated as an ear icon. Here, the implicit feedback in response to the speech direction of the user is performed by the graphic with a shape of an arrow or an ear indicating the position of the sound input unit 110 in the example illustrated in FIG. 16A.

Figure 16B:
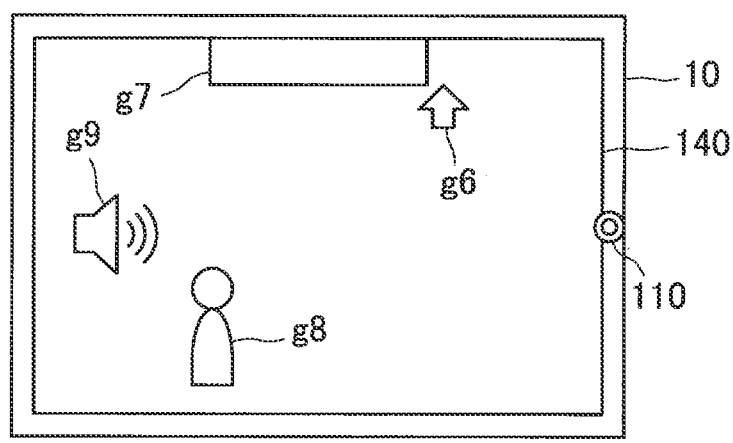
FIG. 16B is an example of feedback using a graphic according to the embodiment.

Next, the description will be continued using FIG. 16. In the example illustrated in FIG. 16B, feedback indicating relative positions between the input and output terminal 10 and the user is performed unlike FIG. 16A. Referring to FIG. 16B, graphics g6 to g9 are represented on the display unit 140 of the input and output terminal 10. Here, the graphic g6 is displayed as an arrow indicating the position of the sound input unit 110. In addition, the graphics g7 and g8 are icons indicating the input and output terminal 10 and the user, respectively. As described above, In the example illustrated in FIG. 16B, the implicit feedback in response to the speech direction of the user is performed by the arrow indicating the position of the sound input unit 110 while indicating the relative positions between the input and output terminal 10 and the user. In addition, feedback indicating a sound source other than the user may be performed as represented by the graphic g9 in the example illustrated in FIG. 16B. An effect that the speech position of the user is improved by the user visually recognizing the graphic indicating the sound source is expected.

3. Hardware Configuration Examples of Input and Output Terminal 10 and Information Processing Apparatus 30

Figure 17:
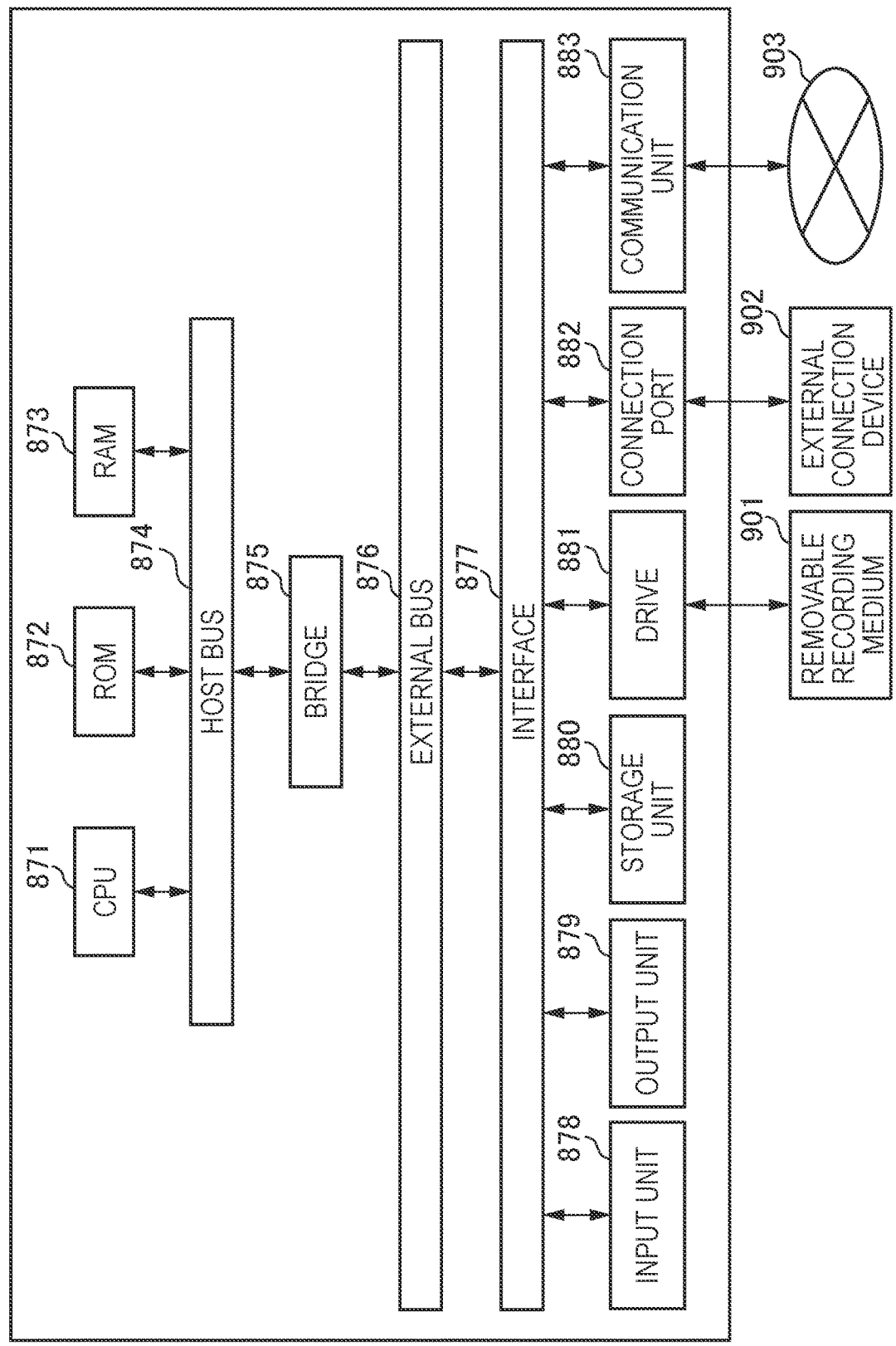
FIG. 17 is a diagram illustrating a hardware configuration example of the input and output terminal and the information processing apparatus.

Next, a hardware configuration example that is shared by the input and output terminal 10 and the information processing apparatus 30 according to the present disclosure will be described. FIG. 17 is a block diagram illustrating a hardware configuration example of the input and output terminal 10 and the information processing apparatus 30 according to the present disclosure. Referring to FIG. 17, the input and output terminal 10 and the information processing apparatus 30 have a CPU 871, a ROM 872, a RAM 873, a host bus 874, a bridge 875, an external bus 876, an interface 877, an input unit 878, an output unit 879, a storage unit 880, a drive 881, a connection port 882, and a communication unit 883, for example. Note that the hardware configuration described here is an example, and a part of the components may be omitted. In addition, components other than the components described here may further be included.

(CPU 871)

The CPU 871 functions as an arithmetic processing device or a control device, for example, and controls an entirety or a part of operations of the respective components on the basis of various programs recorded in the ROM 872, THE ram 873, the storage unit 880, or a removable recording medium 901.

(ROM 872, RAM 873)

The ROM 872 is means for storing programs read by the CPU 871, data used for arithmetic operations, and the like. The programs read by the CPU 871 and various parameters and the like that appropriately change when the programs are executed, for example, are temporally or permanently stored in the RAM 873.

(Host Bus 874, Bridge 875, External Bus 876, Interface 877)

The CPU 871, the ROM 872, and the RAM 873 are connected to each other via the host bus 874 that can transmit data at a high speed, for example. Meanwhile, the host bus 874 is connected to the external bus 876 with a relatively low data transmission speed via the bridge 875, for example. In addition, the external bus 876 is connected to a variety of components via the interface 877.

(Input Unit 878)

A mouse, a keyboard, a touch panel, a button, a switch, a lever, and the like are used, for example, as the input unit 878. Further, a remote controller (hereinafter, also referred to as remote) capable of transmitting control signals by using infrared rays or other radio waves is used as the input unit 878 in some cases.

(Output Unit 879)

The output unit 879 is a device capable of visually or audibly notifying the user of acquired information, such as a display device such as a cathode ray tube (CRT), an LCD, or an organic EL, an audio output device such as a speaker or a headphone, a printer, a mobile phone, or a facsimile, for example.

(Storage Unit 880)

The storage unit 880 is a device for storing various kinds of data. A magnetic storage device such as a hard disk drive (HDD), a semiconductor storage device, an optical storage device, a magneto-optical storage device, or the like is used as the storage unit 880, for example.

(Drive 881)

The drive 881 is a device that reads information recorded in a removable recording medium 901 such as a magnetic disk, an optical disk, a magneto-optical disk, or a semiconductor disk or writes information in the removable recording medium 901, for example.

(Removable Recording Medium 901)

The removable recording medium 901 is a DVD medium, a Blu-ray (registered trademark) medium, an HD DVD medium, various semiconductor storage media or the like. It is a matter of course that the removable recording medium 901 may be an IC card with a non-contact-type IC chip mounted thereon, an electronic device, or the like, for example.

(Connection Port 882)

The connection port 882 is a universal serial bus (USB) port, an IEEE 1394 port, a small computer system interface (SCSI), an RS-232C port, or an optical audio terminal or a port for connecting an external connection device 902 such as an optical audio terminal.

(External Connection Device 902)

The external connection device 902 is a printer, a mobile music player, a digital camera, a digital video camera, an IC recorder, or the like, for example.

(Communication Unit 882)

The communication unit 883 is a communication device for establishing connection to the network 903 and is a wired or wireless LAN, Bluetooth (registered trademark), a wireless USB (WUSB) communication card, an optical communication router, an asymmetric digital subscriber line (ADSL) router, or models for various kinds of communication, or the like.

4. Conclusion

As described above, the information processing apparatus 30 can select a feedback mode in response to a speech style of the user from among the plurality of modes in accordance with the information related to the recognition of the speech of the user. The first mode in which the implicit feedback is performed and the second mode in which the explicit feedback is performed may be included in the aforementioned plurality of modes. In addition, the sound volume of the speech, the speech speed, the speech pitch, the clarity of pronunciation, the speech position, the speech direction, the speech content, and the environmental sound may be included in the aforementioned speech style. With such a configuration, it is possible to realize more natural dialog between the user and the system.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a control unit that selects a feedback mode in response to a speech style of a user from among a plurality of modes in accordance with information related to recognition of speech of the user, in which the plurality of modes include a first mode in which implicit feedback is performed and a second mode in which explicit feedback is performed.

(2)

The information processing apparatus according to (1), in which in the first mode, feedback including an indirect improvement method in response to the speech style of the user is performed, and in the second mode, feedback indicating a direct improvement method in response to the speech style of the user is performed.

(3)

The information processing apparatus according to (2), in which the information related to recognition of speech of the user includes user information, content information, environment information, and device information.

(4)

The information processing apparatus according to (3), in which the user information includes the speech style of the user, and the control unit selects the first mode or the second mode on a basis of the speech style of the user.

(5)

The information processing apparatus according to (4), in which at least one of a sound volume of speech, a speech speed, a speech pitch, clarity of pronunciation, a speech position, and a speech direction is included in the speech style.

(6)

The information processing apparatus according to (4) or (5), in which the control unit selects the second mode on a basis of an event in which no improvement is observed in the speech style of the user who has received the feedback in the first mode.

(7)

The information processing apparatus according to any one of (4) to (6), in which the control unit selects the second mode on a basis of an event in which the speech of the user is not recognized within a predetermined number of times after the feedback in the first mode is performed.

(8)

The information processing apparatus according to any one of (3) to (7), in which the user information includes content of the speech of the user, and the control unit selects the first mode or the second mode on a basis of the content of the speech of the user.

(9)

The information processing apparatus according to (8), in which the control unit selects the second mode on a basis of an event in which the content of the speech of the user is estimated to include privacy information.

(10)

The information processing apparatus according to any one of (3) to (9), in which the control unit selects the first mode on a basis of an event in which presence of another person who is different from the user is estimated from the environment information.

(11)

The information processing apparatus according to any one of (3) to (10), in which the user information includes attribute information of the user, and the control unit selects the first mode or the second mode on a basis of the attribute information of the user.

(12)

The information processing apparatus according to any one of (3) to (11), in which the user information includes emotion information of the user, and the control unit selects the first mode or the second mode on a basis of the emotion information of the user estimated from the speech of the user.

(13)

The information processing apparatus according to any one of (4) to (12), in which, in the first mode, feedback is performed at a sound volume with higher recognition accuracy than a sound volume of speech of the user.

(14)

The information processing apparatus according to any one of (4) to (13), in which, in the first mode, feedback is performed at a speed with higher recognition accuracy than a speech speed of the user.

(15)

The information processing apparatus according to any one of (4) to (14), in which, in the first mode, feedback is performed at a pitch with higher recognition accuracy than a pitch of the speech of the user.

(16)

The information processing apparatus according to any one of (2) to (15), in which, in the second mode, feedback to which a reason for improving the speech style is added is performed.

(17)

The information processing apparatus according to any one of (2) to (16), in which the feedback includes feedback through visual information.

(18)

The information processing apparatus according to any one of (2) to (17), in which the second mode, feedback indicating that speech is to be made with respect to another sensor that is different from a sensor that has detected the speech of the user is performed.

(19)

The information processing apparatus according to (11), in which at least one of a sex, an age, a language used, and a trend of a speech style is included in the attribute information of the user.

(20)

The information processing apparatus according to (12), in which the control unit selects the first mode on a basis of an event in which the user is estimated to be in an excited state.

(21)

The information processing apparatus according to any one of (1) to (20), in which in the first mode, feedback using artificial sound in accordance with the speech style of the user is performed.

(22)

The information processing apparatus according to (17), in which the visual information includes letters, symbols, avatars, indicators, or a change in an image.

(23)

An information processing method including:

selecting, by a processor, a feedback mode in response to a speech style of a user from among a plurality of modes in accordance with information related to recognition of speech of the user, in which the plurality of modes include a first mode in which implicit feedback is performed and a second mode in which explicit feedback is performed.

(24)

A program that causes a computer to function as an information processing apparatus including:

a control unit that selects a feedback mode in response to a speech style of a user from among a plurality of modes in accordance with information related to recognition of speech of the user, in which the plurality of modes include a first mode in which implicit feedback is performed and a second mode in which explicit feedback is performed.

REFERENCE SIGNS LIST

10 input and output terminal
110 sound input unit
120 sensor unit
130 sound output unit
140 display unit
150 terminal control unit
160 server communication unit
20 network
30 information processing apparatus
310 terminal communication unit
320 sound analysis unit
330 sound recognition unit
340 state storage unit
350 position detection unit
360 output control unit
370 output DB

The invention claimed is:

1. An information processing apparatus comprising:
a control unit configured to select, from between a plurality of modes, a feedback mode in response to a speech style of a user, based on information related to recognition of speech of the user,
wherein the plurality of modes include a first mode in which implicit feedback is performed and a second mode in which explicit feedback is performed,
in the first mode, feedback in which a style is changed in response to the speech style of the user is performed, the style of the first mode including a volume of the feedback of the first mode,
in the second mode, feedback in which a style is not changed in response to the speech style of the user is performed,
the control unit is further configured to select the second mode based on a level of the volume of the feedback of the first mode increasing a predetermined number of times on a basis of the speech of the user not being recognized within the predetermined number of times after the feedback in the first mode is performed, and the control unit is implemented via at least one processor.

2. The information processing apparatus according to claim 1, wherein the predetermined number of times corresponds to a maximum level of the style of the second mode.

3. The information processing apparatus according to claim 1,
wherein in the first mode, the feedback in which a style is changed includes an indirect improvement method, and
in the second mode, the feedback in which a style is not changed includes a direct improvement method.

4. The information processing apparatus according to claim 3, wherein, in the second mode, feedback to which a reason for improving the speech style is added is performed.

5. The information processing apparatus according to claim 3, wherein the feedback includes feedback through visual information.

6. The information processing apparatus according to claim 3, wherein in the second mode, feedback indicating that speech is to be made with respect to another sensor that is different from a sensor that has detected the speech of the user is performed.

7. The information processing apparatus according to claim 3, wherein the information related to recognition of speech of the user includes user information, content information, environment information, and device information.

8. The information processing apparatus according to claim 7, wherein the control unit is further configured to select the first mode on a basis of an event in which presence of another person who is different from the user is estimated from the environment information.

9. The information processing apparatus according to claim 7,
wherein the user information includes attribute information of the user, and
the control unit is further configured to select the first mode or the second mode on a basis of the attribute information of the user.

10. The information processing apparatus according to claim 7,
wherein the user information includes emotion information of the user, and
the control unit is further configured to select the first mode or the second mode on a basis of the emotion information of the user estimated from the speech of the user.

11. The information processing apparatus according to claim 7, wherein the user information includes content of the speech of the user, and
the control unit is further configured to select the first mode or the second mode on a basis of the content of the speech of the user.

12. The information processing apparatus according to claim 11, wherein the control unit is further configured to select the second mode on a basis of an event in which the content of the speech of the user is estimated to include privacy information.

13. The information processing apparatus according to claim 7,
wherein the user information includes the speech style of the user, and
the control unit is further configured to select the first mode or the second mode on a basis of the speech style of the user.

14. The information processing apparatus according to claim 13, wherein at least one of a sound volume of speech, a speech speed, a speech pitch, clarity of pronunciation, a speech position, and a speech direction is included in the speech style.

15. The information processing apparatus according to claim 13, wherein the control unit is further configured to select the second mode on a basis of an event in which no improvement is observed in the speech style of the user who has received the feedback in the first mode.

16. The information processing apparatus according to claim 13, wherein, in the first mode, feedback is performed at a sound volume with higher recognition accuracy than a sound volume of speech of the user.

17. The information processing apparatus according to claim 13, wherein, in the first mode, feedback is performed at a speed with higher recognition accuracy than a speech speed of the user.

18. The information processing apparatus according to claim 13, wherein, in the first mode, feedback is performed at a pitch with higher recognition accuracy than a pitch of the speech of the user.

19. An information processing method comprising:
selecting, by a processor, from between a plurality of modes, a feedback mode in response to a speech style of a user, based on information related to recognition of speech of the user,
wherein the plurality of modes include a first mode in which implicit feedback is performed and a second mode in which explicit feedback is performed,
in the first mode, feedback in which a style is changed in response to the speech style of the user is performed, the style of the first mode including a volume of the feedback of the first mode,
in the second mode, feedback in which a style is not changed in response to the speech style of the user is performed, and
the selection of the feedback mode includes selecting the second mode based on a level of the volume of the feedback of the first mode increasing a predetermined number of times on a basis of the speech of the user not being recognized within the predetermined number of times after the feedback in the first mode is performed.

20. A non-transitory computer-readable medium having embodied thereon a program, which when executed by a computer causes the computer to execute as an information processing method, the method comprising:
selecting, from between a plurality of modes, a feedback mode in response to a speech style of a user, based on information related to recognition of speech of the user,
wherein the plurality of modes include a first mode in which implicit feedback is performed and a second mode in which explicit feedback is performed,
in the first mode, feedback in which a style is changed in response to the speech style of the user is performed, the style of the first mode including a volume of the feedback of the first mode,
in the second mode, feedback in which a style is not changed in response to the speech style of the user is performed, and
the selection of the feedback mode includes selecting the second mode based on a level of the volume of the feedback of the first mode increasing a predetermined number of times on a basis of the speech of the user not being recognized within the predetermined number of times after the feedback in the first mode is performed.

* * * * *